(12) United States Patent
Lefebvre et al.

(10) Patent No.: US 10,860,510 B2
(45) Date of Patent: Dec. 8, 2020

(54) SECURE, REMOTE SUPPORT PLATFORM WITH AN EDGE DEVICE

(71) Applicants: Jeremy Lefebvre, Port Hope (CA); Joseph Jonathan Stubbs, Brampton (CA); Gregory Thomas McMullin, Mississauga (CA)

(72) Inventors: Jeremy Lefebvre, Port Hope (CA); Joseph Jonathan Stubbs, Brampton (CA); Gregory Thomas McMullin, Mississauga (CA)

( * ) Notice: Subject to any disclaimer, the term of this patent is extended or adjusted under 35 U.S.C. 154(b) by 0 days.

(21) Appl. No.: 16/649,142

(22) PCT Filed: Sep. 20, 2018

(86) PCT No.: PCT/US2018/052022
§ 371 (c)(1),
(2) Date: Mar. 20, 2020

(87) PCT Pub. No.: WO2019/060593
PCT Pub. Date: Mar. 28, 2019

(65) Prior Publication Data
US 2020/0311241 A1    Oct. 1, 2020

Related U.S. Application Data

(60) Provisional application No. 62/560,704, filed on Sep. 20, 2017, provisional application No. 62/560,707, (Continued)

(51) Int. Cl.
*G06F 21/34* (2013.01)
*G06F 13/40* (2006.01)
(Continued)

(52) U.S. Cl.
CPC ........ *G06F 13/4022* (2013.01); *G06F 9/4411* (2013.01); *G06F 9/452* (2018.02);
(Continued)

(58) Field of Classification Search
None
See application file for complete search history.

(56) References Cited

U.S. PATENT DOCUMENTS 6,636,929 B1    10/2003    Frantz et al.
7,085,805 B1    8/2006    Ruberg et al.
(Continued)

OTHER PUBLICATIONS

PCT Application Serial No. PCT/US2018/051935, International Search Report, dated May 8, 2019, 5 pages.
(Continued)

*Primary Examiner* — Brandon S Hoffman
(74) *Attorney, Agent, or Firm* — Gilliam IP PLLC

(57) ABSTRACT

A secure, remote support platform allows secure, remote device support with an edge device (101) and a trusted intermediary server resource ("trusted server"). The trusted server (113) is an endpoint for secure connections with a support application used by a remote technician and with the edge device. The secure connections carry messages with inputs, data requests, and feedback. Messages between the trusted server and support edge device are secured in a manner that allows each endpoint to validate the messages. The remote technician controls the edge device to assesses a target device connected to the edge device. The edge device presents emulated peripheral devices to the target device while capturing the target device desktop with a camera or presents remotely controlled peripherals and returns screen captures or updates of the desktop from the target device.

7 Claims, 10 Drawing Sheets

Related U.S. Application Data filed on Sep. 20, 2017, provisional application No. 62/560,708, filed on Sep. 20, 2017, provisional application No. 62/560,710, filed on Sep. 20, 2017.

(51) Int. Cl.

| | | |
|---|---|---|
| *G06F 13/38* | (2006.01) | |
| *G06F 13/42* | (2006.01) | |
| *G06F 9/451* | (2018.01) | |
| *G06F 9/4401* | (2018.01) | |
| *G06F 21/30* | (2013.01) | |
| *G06F 21/60* | (2013.01) | |

(52) U.S. Cl.
CPC ........ *G06F 13/385* (2013.01); *G06F 13/4045* (2013.01); *G06F 13/4282* (2013.01); *G06F 21/305* (2013.01); *G06F 21/34* (2013.01); *G06F 21/606* (2013.01); *G06F 2213/0042* (2013.01); *G06F 2213/4004* (2013.01)

(56) References Cited

U.S. PATENT DOCUMENTS

| | | | |
|---|---|---|---|
| 7,240,106 B2 | 7/2007 | Cochran et al. | |
| 8,156,267 B2 | 4/2012 | Chen et al. | |
| 8,595,321 B2 | 11/2013 | Hoang | |
| 9,626,512 B1 | 4/2017 | Brandwine et al. | |
| 2009/0024746 A1 | 1/2009 | Welch | |
| 2009/0085873 A1* | 4/2009 | Betts | G08B 21/0275 |
| | | | 345/169 |
| 2010/0199008 A1 | 8/2010 | Lee et al. | |
| 2011/0276625 A1 | 11/2011 | Shah | |
| 2013/0007224 A1 | 1/2013 | Yang | |
| 2015/0229613 A1 | 8/2015 | Baum et al. | |
| 2016/0371213 A1 | 12/2016 | Voto et al. | |
| 2017/0272415 A1* | 9/2017 | Zhao | H04L 63/0807 |
| 2017/0346851 A1* | 11/2017 | Drake | H04W 12/02 |
| 2018/0234320 A1* | 8/2018 | Paulraj | H04W 28/0268 |

OTHER PUBLICATIONS

PCT Application Serial No. PCT/US2018/051935, Written Opinion, dated May 8, 2019, 9 pages.

PCT Application Serial No. PCT/US2018/052022, International Search Report, dated Jan. 17, 2019, 2 pages.

PCT Application Serial No. PCT/US2018/052022, Written Opinion, dated Jan. 17, 2019, 7 pages.

PCT Application Serial No. PCT/US2018/052071, International Search Report, dated Feb. 8, 2019, 2 pages.

PCT Application Serial No. PCT/US2018/052071, Written Opinion, dated Feb. 8, 2019, 6 pages.

Hirofuchi, et al., "USB/IP—A Peripheral Bus Extension for Device Sharing Over IP Network", USENIX Association Annual Technical Conference, retrieved on Mar. 25, 2019 from https://www.usenix.org/legacy/event/usenix05/tech/freenix/hirofuchi/hirofuchi.pdf, Jan. 2005, pp. 47-60.

* cited by examiner

US 10,860,510 B2

SECURE, REMOTE SUPPORT PLATFORM WITH AN EDGE DEVICE

TECHNICAL FIELD

The disclosure generally relates to the field of digital processing systems, and more particularly to support.

BACKGROUND ART

Technical support or information technology (IT) support has grown with computing technology and the Internet. Technical support can be remote or on-site. Across business and consumer domains, remote technical support is preferred due to lower cost and greater practicality than on-site support. Support technicians use remote support software to reduce the gap between on-site support and remote phone support. With remote support software, a support technician can collect information about a device and remotely control the device.

While remote support software can be used to address a number of issues of a computer (e.g., configuration changes, application settings, software installation and updates), remote support software relies upon the computer having an established Internet connection. To have an established Internet connection, the computer loads network interface drivers after boot-up of the operating system and needs to be properly configured for connecting to an available network. A variety of issues can prevent a computer from loading its operating system, including user error. A problem could be occurring as part of the boot up sequence or due to a power-related issue. Furthermore, secure remote support relies on virtual private network (VPN) software or network access control (NAC) software that would not be executing if the computer cannot boot up. In addition to boot-up or power related issues, other software issues may prevent the computer from executing or loading VPN or NAC software.

BRIEF DESCRIPTION OF THE DRAWINGS

Aspects of the disclosure may be better understood by referencing the accompanying drawings.

DESCRIPTION OF EMBODIMENTS

Figure 1:
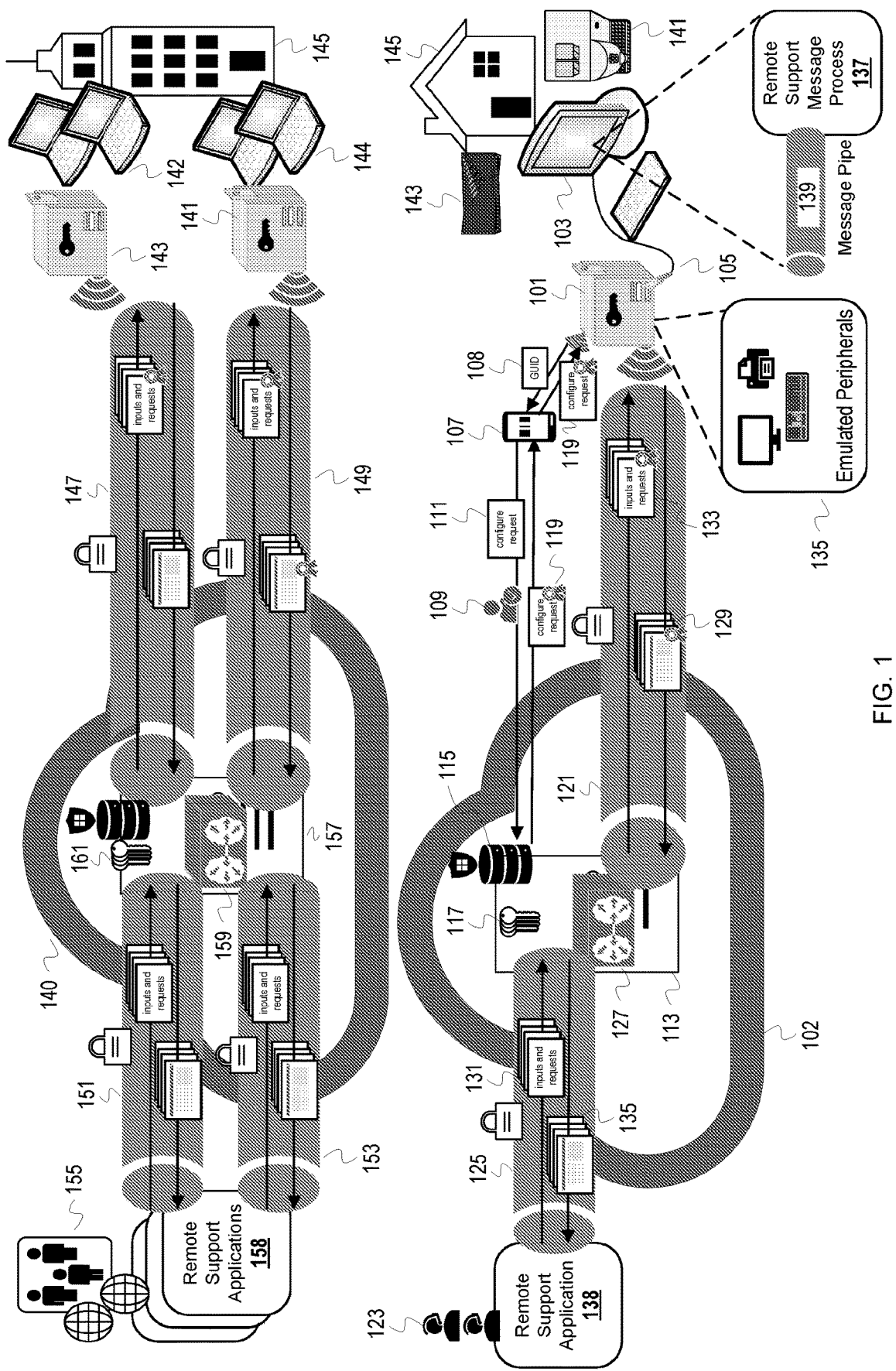
FIG. 1 is a diagram of an example remote support system that allows for secure device support and/or management via an edge device.

The description that follows includes example systems, methods, techniques, and program flows that embody aspects of the disclosure. However, it is understood that this disclosure may be practiced without these specific details. For instance, this disclosure refers to a universal serial bus connection in illustrative examples. Aspects of this disclosure can be instead applied to other wired connection mediums and wireless connections. In other instances, well-known instruction instances, protocols, structures and techniques have not been shown in detail in order not to obfuscate the description.

Overview

A system has been created that facilitates comprehensive and secure, remote technical support that can be troubleshooting and/or device management. The system includes an edge device that operates as a highly secured conduit for a technician to view, access, and control a target device via a secure protocol over a connection medium between the edge device and the target device. An authenticated user can submit an authorized request to initiate a support session. The authorized request may be for the edge device to connect to a chosen network. After the edge device obtains network access, the edge device establishes a secure connection with a trusted server. A technician authenticated to the trusted server and authorized to access the edge device also establishes a secure connection with the trusted server. Over these secure connections, the remote technician sends support messages to the edge device. These support messages can carry payloads including requests to collect data about the target device, control commands, and peripheral device inputs to the target device. The edge device's architecture allows it to present numerous peripheral devices to the target device while preserving compactness of the edge device. The edge device also obtains feedback (e.g., screen updates) from the target device and communicates the feedback to the remote technician in feedback messages over the secure connections. The messages communicated between the trusted server and the edge device are signed by the sender and validated by the recipient.

Between the edge device and the target device, support messages can initially be universal serial bus (USB) standard compliant messages that are routed through a hub and switches of the edge device according to peripheral device emulation. Based on satisfying a mode change criterion (e.g., successful loading of the target device's operating system), the edge device can switch to a different message path that utilizes a back-to-back USB microcontrollers architecture that communicates the remote technician messages more efficiently. Messages can be communicated more efficiently by passing through support messages that include peripheral inputs from the remote technician instead of emulating peripheral devices based on peripheral inputs from a remote technician. In addition, the more direct path for peripheral inputs and feedback avoid the delay common when emulating peripheral devices. This faster communication path passes the support messages to a remote support message process/application on the target device. The remote support message process processes the received support messages to determine whether the messages are legacy messages to be passed on to a specified driver or messages to be examined and unpacked according to a remote support messaging protocol for the remote device support.

Remote Support Platform Example Illustrations

FIG. 1 is a diagram of an example remote support system that allows for secure device support and/or management via an edge device. Numerous use cases are possible, but FIG. 1 only depicts two use cases: 1) a third party support service to consumer customers and 2) internal enterprise device support/management. In both use cases, the support system involves remote technicians, trusted intermediary server resources, and support edge devices. The support edge devices ("edge devices") can be considered local support relays for the remote technicians.

In the consumer scenario, the remote technicians may be technicians of a support service associated with a retailer of edge devices or may be technicians of a third party service distinct from the entity that provides the edge devices to consumers. Regardless of the specific realization, roles or identifiers of technicians 123 are associated with an edge device 101. Either through role based association or user identifier based association, the technicians 123 have been authorized to access the edge device 101 as indicated in an authentication and authorization database 115. The database 115 is accessible by a server 113, which is a trusted server resource from the perspective of the edge device 101. A single server 113 is depicted, but implementations may have multiple trusted servers and a load balancer(s). The technicians 123 and the edge device 101 can communicate with the server 113 via a network 102. The server 113 may be a trusted server resource of an entity that also manages the technicians 123 or a separate entity. The server 113 has been supplied or given access to security keys 117 that allow access of edge devices including the edge device 101. These security keys 117 have been previously associated with or assigned to edge devices in a secure manner, such as at secure facility during the manufacturing process of the edge devices.

A consumer location 145 (e.g., a small business, residential unit, etc.) has several devices with connection ports (e.g., a universal serial bus interface) that can be supported via the edge device 101. Solely for example illustration of the variety of devices that can be supported, FIG. 1 depicts the consumer location 145 as having a gaming console 143, an espresso machine 141, and a computer 103. Each of these can be referred to as a "target device" when connected to the edge device 101 for support. This example illustration of the consumer use case uses the computer 103 as the target device.

As a security measure to protect the edge device 101 from being activated and used by a bad actor, connecting the edge device 101 to a network can be restricted to a secure configuration request. The edge device 101 includes components which support wireless communication for configuration and activation related communications. The wireless communication may be based on a near field communication (NFC) connection, a Bluetooth connection, etc. Activation of components for wireless communication may be dependent upon activation of a button or other hardware based mechanism of the edge device 101. The edge device 101 transmits a unique identifier 108 (e.g., serial number or globally unique identifier) via the components for wireless communication. Embodiments of the edge device 101 may display the unique identifier or display an encoding (e.g., barcode) of the unique identifier instead of transmitting. A user at the consumer location 145 authenticates with an application for the edge device 101 that is installed and executed on a mobile device 107, such as a smartphone or tablet. The application on the mobile device 107 (or a third party authentication application) sends an authentication message 109 with user credentials. If authentication fails, then the user cannot activate the edge device 101. Assuming successful authentication, the application on the mobile device 107 presents via a user interface a listing of detected edge devices, which include the edge device 101 in this example based on transmission of the identifier 108. The application on the mobile device 107 also presents the authenticated user with network connection options for the edge device 101 (e.g., cellular network, wireless local area network (LAN), etc.). The edge device 101 may communicate networking capabilities, at least for configuration and activation, with its identifier 108. Based on selection of a connection option, the application on the mobile device 107 generates a configuration request message 111 indicating the selected option (e.g., a named wireless LAN) and transmits the request message 111 to the server 113. The server 113 accesses the database 115 to determine whether the authenticated user is authorized to at least select a network connection option for the edge device 101. If so, then the server 113 (or security software running on the server 113) signs the request 111 and generates a signed configure request 119. The server 113 signs with the one of the keys 117 that corresponds to the edge device 101. The server 113 may lookup the key with the unique identifier communicated in the configure request message 111. The server 113 communicates the signed configure request 119 to the support application on the mobile device 107, and the mobile device 107 forwards the signed configure request 119 to the edge device 101. The edge device 101 validates the signed configure request 119 with a locally stored key. Assuming validation, the edge device 101 connects to the wireless LAN named in the signed configure request 119 that has been validated.

After connecting to the wireless LAN according to the signed configure request 119, edge device 101 establishes a remote support session with a remote support application 138 used by the remote technicians 123. After identification or selection of the remote technicians 123 for the edge device 101, the edge device 101 establishes a secure connection (e.g., an application layer connection secured with secure sockets layer (SSL) or Transport Layer Security (TLS)) with the server 113. The secure connections facilitates communication of application support messages between the remote technicians 123 and the edge device 101. The secure connection leverages an open HTTPS port and thus does not necessitate opening an additional port in a firewall that likely already has a port for HTTPS open. The edge device 101 establishes a secure connection 121 with the server 113 as an endpoint.

A secure connection can also be established between the remote support application 138 and the server 113 to facilitate communication of application support messages between the remote support application 138 and the server 113. The server 113 can determine with the database 115 that the remote technicians 123 can access the edge device 101. The server 113 interacts with the remote technicians 123 (e.g., generates a notification to the remote technicians 123)

to facilitate establishing a secure connection 125 between the remote support application 138 and the server 113 as the endpoints. These secure connections 121, 125 and the server 113 form a secure path. With the server 113 operating as a bridge or switch, information securely flows between the remote technicians 123 and the edge device. When the server 113 receives messages from the edge device 101, the messages are decrypted, validated, and then re-encrypted for the secure connection 125 if valid. Similarly, the server 113 decrypts messages from the remote support application 138, signs the messages with a key associated with the edge device 101, and re-encrypts those signed messages for communication over the secure connection 121.

After the secure path has been established, the remote technicians 123 can access and control the edge device 101 via the remote support application 138. In response, the edge device 101 communicates requested information, video, and/or screen updates as feedback to the remote technicians 123. The edge device 101 includes video streaming capability and can begin transmitting video of the target device 103 to the remote technicians 123. The remote technicians 123 can assess state of the target device 103 including guiding someone on power up and connecting the edge device 101 to the target device 103. The remote technicians 123 can guide a user in placing the edge device 101 in viewing range of the target device 103 and then control a camera of the edge device 101 to visually assess the target device 103. The edge device 101 has an array of capabilities available to assess a target device based upon state of the target device. With more functionality available on the target device (e.g., completing load of an operating system), the edge device 101 provides remote technicians more information and greater access to a target device.

With a single connection between the edge device 101 and the target device 103, the remote technicians 123 can do a more in-depth assessment of the target device 103. Prior to obtaining this level of access, some embodiments may impose another security measure that limits the edge device 101 to target devices associated or bound to the edge device 101. For this additional security measure, the edge device 101 communicates with the server 113 via the secure connection 121 to determine whether the edge device 101 is authorized to access the target device 103. Establishing authorization of an edge device to access a target device can be done after a user obtains the edge device 101. The user can register devices in association with the edge device with the support service to establish permission for an edge device to access devices identified or selected by the user.

For this example, a cable 105 connects a universal serial bus (USB) interface of the edge device 101 to the target device 103. The edge device 101 can present emulated peripherals 135 to the target device 103 for assessing the target device 103. The edge device 101 can present these emulated peripherals over the cable 105 to a standard interface driver on the target device 103. If a remote support message process 137 can be executed on the target device 103, then the edge device 101 can efficiently communicate a compact message with inputs and/or requests corresponding to different remote peripheral devices ("remote support message"). The edge device 101 establishes a message pipe 139 with the remote support message process 137 above the physical layers and can communicate both remote support messages and legacy USB messages.

The inputs and requests transmitted to the target device 103 from the edge device 101 originate from the remote support application 138 being used by the remote technicians 123. The remote technicians 123 transmit remote support messages 131 with inputs (e.g., keystrokes) and requests (e.g., telemetry requests) over the secure connection 125 to the server 113. The server 113 uses the key of the edge device 101 to sign the remote support messages 131 from the remote support application 138. The signing generates signed remote support messages 133. After decrypting the messages 133, the edge device 101 validates the signatures and then either communicates the validated remote support messages 133 directly to the target device 103 or communicates the validated remote support messages 133 to the emulator presenting the emulated peripherals 135. The edge device 101 communicates feedback from the target device 103 in signed feedback messages 129 to the server 113 over the secure connection 121. When the edge device 101 receives a feedback message (e.g., a remote display protocol message or a telemetry response message), the edge device 101 signs the message with a key of the edge device 101. The server 113 decrypts the messages 129, validates the signed messages 129, and then re-encrypts the messages to generate feedback messages 135 if valid. The server 113 communicates the feedback messages 135 via the secure connection 125 to the remote support application 138.

The digital signing by the trusted server 113 and the edge device 101 is one technique of securing messages between the trusted server 113 and the edge device 101. The technique of securing messages can vary across embodiments with the type of key paradigm used. In some embodiments, the trusted server 113 and the edge device 101 have a pre-shared key (PSK) that is used with a cryptographic hash function to sign messages. To sign the messages, a hash generated with the cryptographic hash function and PSK is appended to the message. In some embodiments, the PSK is concatenated with the hash. In some embodiments, the edge device 101 and the trusted server 113 secure messages by encrypting and decrypting messages according to asymmetric cryptography. The trusted server 113 and edge device 101 may be assigned decryption keys and encryption keys. Instead of validating a message signature, the trusted server 113 would decrypt a message from the edge device 101 using a decryption key that corresponds to the encryption key used by the edge device 101. Likewise, the edge device 101 would decrypt messages from the trusted server 113 using a decryption key that corresponds to the encryption key used by the trusted server 113 for messages sent to the edge device 101. The paradigm used to secure the messages uses keys that are distinct from the session key(s) used for communicating the messages according to the secure communication connection protocol (e.g., SSL or TLS).

Since the server 113 likely manages multiple secure paths between remote support entities and portable edge devices, the server 113 maintains a switching or bridging structure 127. The structure 127 binds secure connections that form a secure path via the server 113. The server 113 restricts bridging or forwarding of messages to comply with the bindings indicated in the structure 127.

While the internal enterprise support use case may vary from the consumer use case, the support system elements and operations are similar. Due to the similarities, some illustration details are omitted for the enterprise use case. An enterprise location 145 (e.g., data center or corporate site), houses numerous devices including a set of computers 142 and a set of computers 144. In addition to technical troubleshooting, portable edge devices 141, 143 can be used to manage devices of the enterprise, such as ensuring timely software updates or secure configurations. The edge devices 141, 143 are not depicted with radio waves because the enterprise use case supposes a security dongle requirement in order to activate the edge devices 141, 143 as an example alternative to wireless communication.

After authentication and authorization for activating the edge devices 141, 143, the edge devices 141, 143 respectively establish security connections 147, 149 with a trusted server 157 over a network 140. The trusted server 157 may be a trusted server resource of a third party service provider or of the enterprise. A single trusted server 157 is depicted, but implementations likely have multiple trusted servers and a load balancer. As in the consumer case, global technicians 155 use instances 158 of a remote support application to communicate remote support messages for accessing and controlling the edge devices 141, 143 as well as target devices 142, 144. The remote support application instances 158 establish secure connections with the trusted sever 157 after authentication and authorization of global technicians 153 for the edge devices 141, 143. The trusted server 157 owns or has access to security keys 161 for the enterprise to sign the messages communicated between the trusted server 157 and the edge devices 141, 143. As mentioned in the consumer use case, the trusted server 157 creates and maintains a structure 159 to bind connections between remote support application instances 158 and the edge devices 141, 143. Over these secured paths, the global technicians 155 across one or multiple locations can support the devices of the enterprise.

Remotely Controlled Support Edge Device

Figure 2:
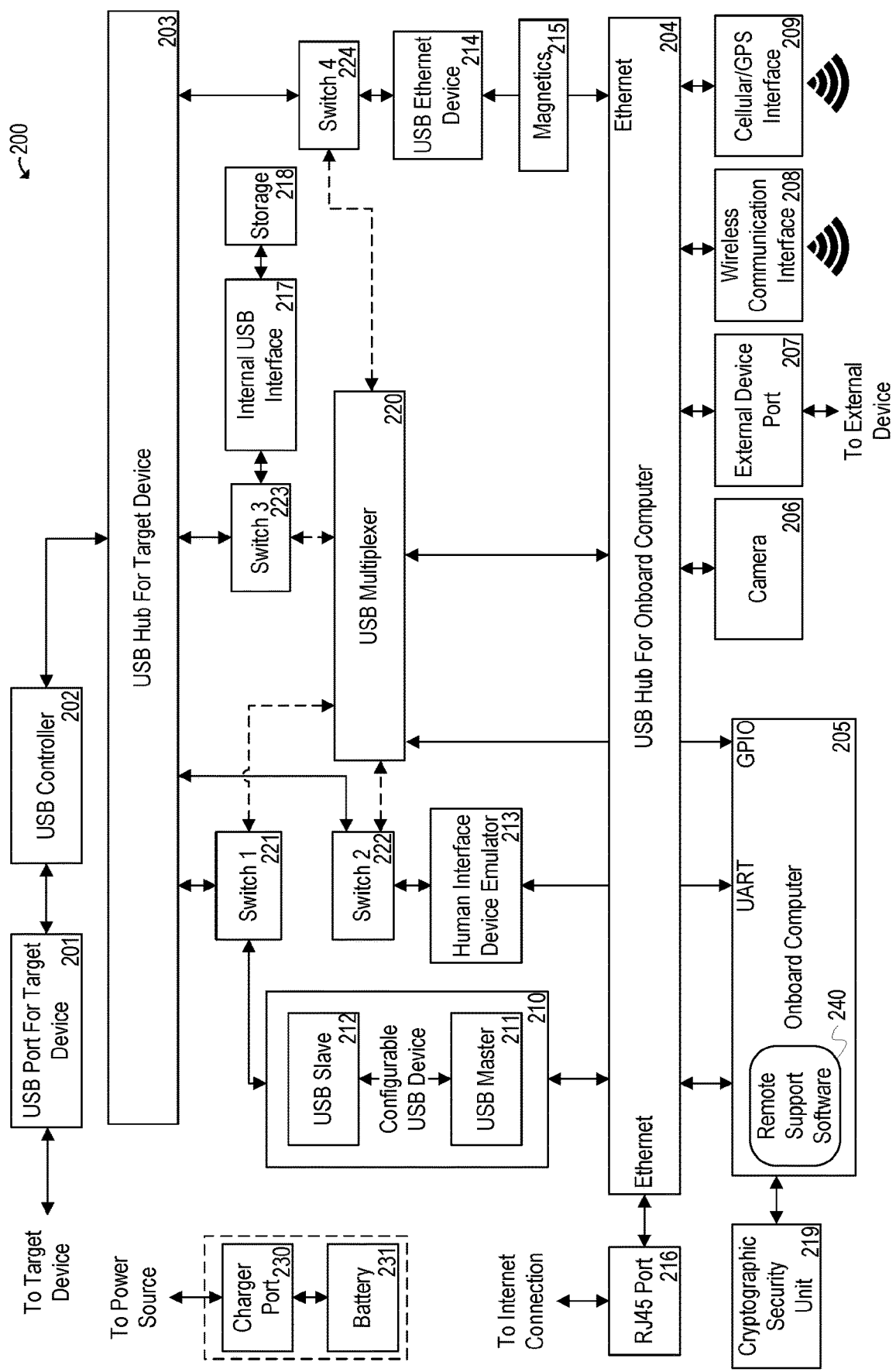
FIG. 2 is an example depiction of hardware components for an edge device capable of remote support of a target device.

FIG. 2 is an example depiction of hardware components for an edge device capable of remote support of a target device. FIG. 2 depicts an edge device 200 having a USB port for target device 201 and a USB controller 202, which support communication with a target device (not depicted). The edge device 200 also includes several USB peripherals and components which facilitate selectively exposing USB peripherals to a target device and an onboard computer 205. These USB peripherals and components include a USB hub for target device 203, a USB hub for onboard computer 205, a configurable USB device 210, a human interface device (HID) emulator 213, an internal USB interface 217, a USB multiplexer 220, and switches 221-224. The configurable USB device 210 includes a USB master 211 and a USB slave 312. The edge device 200 also includes components for providing an internet or network connection to the edge device 200, including a registered jack 45 (RJ45) port 216, a wireless communication interface 208, and a cellular/GPS interface 209. The internet connection provided by these components can be passed to a target device through a USB ethernet device 214. The edge device 200 also includes a camera 206, storage 218, and a cryptographic security unit 219. The edge device 200 is powered by a battery 231 which is charged through a charger port 230.

The components depicted in FIG. 2 may be soldered to one or more printed circuit boards (PCBs) and electrically connected through PCB traces or other connectors. For example, some components, such as the wireless communication interface 208, may be located on daughter board which connect to a motherboard hosting other components through a card edge connector. The connections between the components in FIG. 2 are depicted using a single arrow; however, the components may be connected by multiple traces or communication lanes. For example, the connection between the universal asynchronous receiver/transmitter (UART) of the onboard computer 205 to the HID emulator 213 can include a first trace connection to serve as a transmitting lane and a second trace connection to serve as a receiving lane. Similarly, each of the components may include one or more pins of which some or all may be connected to traces for communication with other components. The pin layout for each component can vary.

The onboard computer 205 executes remote support software 240 ("software 240") to allow for remote access by IT support personnel and control of various components of the edge device 200. In general, the onboard computer 205 includes hardware sufficient for executing an operating system, such as a processor, memory, and storage, and also includes hardware for interfacing with the USB devices and other components of the edge device 200. The onboard computer 205 includes or is connected with a UART for communicating with attached serial devices such as the HID emulator 213. The onboard computer 205 also includes one or more general purpose input/output (GPIO) interfaces for communicating or receiving information from components such as the multiplexer 220. The software 240 can include software to allow the onboard computer 205 to interact with a trusted server and relay messages to a target device, act as a virtual network computing (VNC) endpoint, allow for establishing secure connections using secure shell (SSH) protocols, expose application programming interfaces (APIs) for controlling components (e.g., the switches 221-224, the HID emulator 213, the configurable USB device 210, and the camera 206), etc.

The edge device 200 connects to a target device via a USB cable connected from the USB port for target device 201 to a USB interface on the target device. The USB port for target device 201 is backed by a USB controller 202 which allows for the edge device 200 to present as a USB device/ peripheral and facilitates communications with the target in accordance with various USB protocols. For example, the USB controller 202 can perform a handshake with the USB interface of the target device and establish the edge device 200 as a USB device. Since the edge device 200 acts as a USB device, the USB controller 202 is configured in an upstream facing port implementation, with the target device serving as the USB host or downstream facing port.

The edge device 200 utilizes this connection to expose various USB peripherals to the target device for the purposes of controlling and providing remote technical support for the target device. In some implementations, the USB controller 202 may be switchable to allow for complete disconnection of the edge device 200 from a target device without requiring physical disconnection of a cable between the edge device 200 and a target device.

The USB controller 202 presents the USB hub for target device 203 and any connected USB devices to a target device through the USB port for target device 201. USB devices are selectively connected to the USB hub for target device 203, and therefore selectively presented to a target device through activation of the switches 221-224. Similarly, the USB devices can be selectively connected to the USB hub for onboard computer 204 for presentation to the onboard computer 205. The switches 221-224 are remotely activated through the onboard computer 205 which controls the switches 221-224 through GPIO connections (not depicted) using a serial communication protocol, such as the Inter-integrated Circuit (I2C) Protocol or RS-232. Generally, the switches 221-224 can be controlled by transmitting a high signal for a first setting and a low signal for a second setting, e.g. a first setting for outputting to the USB hub for target device 203 and a second setting for outputting to the multiplexer 220. The switch 1 221 controls whether the USB slave 212 of the configurable USB device 210 is connected to the USB hub for target device 203. The switch 2 222 controls whether the HID emulator 213 is connected to the USB hub for target device 203 or the USB hub for onboard computer 204. The switch 3 323 controls to which hub the storage 218 is connected. The switch 4 224 controls whether the USB ethernet device 214, and therefore an internet connection, is connected to the USB hub for target device 203. The multiplexer 220 allows for the USB devices to be connected to the onboard computer 205 through the USB hub for onboard computer 204. The onboard computer 205 communicates with the multiplexer 220 through the GPIO pins in accordance with a serial communication protocol and can manipulate the multiplexer 220 to selectively connect one or more of the USB devices, such as the storage 218, to the USB hub for onboard computer 204.

The HID emulator 213 mimics the outputs of USB keyboard and mouse devices and allows for keyboard and mouse input from remote IT personnel to be forwarded to a target device. The HID emulator 213 may be a microcontroller which is configured with firmware for emulating keyboard strokes and mouse movement. The onboard computer 205 forwards received keyboard and mouse inputs to the HID emulator 213 through the UART of the onboard computer 205. For example, if remote IT personnel types the letter "A," a program of the software 240 executing on the onboard computer 205 causes the onboard computer 205 to transmit a representation of the letter "A," such as the American Standard Code for Information Interchange (ASCII) representation, to the HID emulator 213 over the UART. In response to receipt of the letter "A" representation, the HID emulator 213 outputs a message with the letter "A" in a USB protocol compatible format which is forwarded to a target device. The target device processes the message of the letter "A" as if it were transmitted by a locally connected USB keyboard device. Because the HID emulator 213 presents as a locally connected USB device, the HID emulator 213 can be used to transmit keystrokes at boot up of a target device to access and control a target device's BIOS or Unified Extensible Firmware Interface (UEFI).

The storage 218 is presented as a USB storage device through the internal USB interface 217. The storage 218 may be flash storage attached to a microcontroller for communicating with the internal USB interface 217. The storage 218 can be presented to the onboard computer 205 to allow for IT personnel to remotely upload data, such as an operating system image. The storage 218 can then be switched via the switch 3 223 and presented to a target device. If the storage 218 is loaded with an operating system installation image, for example, the onboard computer 305 can control the switch 3 223 to present the storage 218 at boot up of a target device so that the target device can boot using the operating system installation image. The onboard computer 205 may also present the storage 218 to a target device and create copies of or quarantine potentially malicious files from the target device to the storage 218. The storage 218 can then be switched back to the onboard computer 205 to allow for the onboard computer 205 to perform a virus scan of the files.

The configurable USB device 210 includes two USB microcontrollers: the USB master 211 and the USB slave 212. Since the USB protocol operates based on a host-device relationship, a USB device cannot be presented to two hosts simultaneously. The configurable USB device 210 solves this issue by including two USB microcontrollers: the USB master 211 which is presented as a USB device to the onboard computer 205 and the USB slave 212 which is selectively presented as a USB device to a target device. The USB master 211 and the USB slave 212 can each be loaded with firmware or program code to cause the microcontrollers to perform as one or more various types of USB devices, e.g. a keyboard, a printer, a mouse, a webcam, a display adapter, etc. For example, configuring the USB slave 212 as a display adapter allows for the display of a target device to be output to the USB slave 212, which may then be forwarded through the USB master 211, the onboard computer 205, and the internet to remote IT personnel. The USB master 211 can also be loaded with firmware that allows for the onboard computer 205 to transmit messages through the USB master 211 for configuring the USB slave 212. The "master" and "slave" terminology refer to this ability of the USB master 211 to control the USB slave 212 and dynamically change its function or USB device type. For example, if trying to diagnose a printer issue, the onboard computer 205 may configure the USB slave 212 through the USB master 211 to present as a USB printer device by reconfiguring the device descriptor fields of the USB slave 212.

In one remote support embodiment, the USB slave 212 is configured as a custom USB device for interfacing with support software installed on a target device. In this embodiment, the USB master 211 is configured to relay messages to and from the USB slave 212 and the onboard computer 205. The USB slave 212 is configured to relay messages to and from the USB master 211 and a target device. The messages can include HID messages, e.g. keyboard strokes and mouse movement; digital video of a display of a target device; data to be stored or loaded onto a target device or retrieved from the target device; messages for other emulated USB devices, such as a printer or storage; and messages with diagnostic information of the target device, such as a processor temperature, whether the processor fan is activated, whether storage drives are connected and healthy, etc. The ability of the configurable USB device 210 to relay USB messages between the onboard computer 205 and the support software on a target device allows for other USB devices within the edge device 200, such as the HID emulator 213 and the storage 218, to be disconnected from the USB hub for target device 203 and no longer presented to the target device. So, messages transmitted to a target device may follow different paths within the edge device 200 depending on a current state of a target device. When the target device is functional and is executing support software for interfacing with the custom USB device as described above, messages from remote IT personnel to the target device can be transmitted to the onboard computer 205 and through the configurable USB device 210. If, however, a target device is not functional or has not yet been equipped with the support software, messages to the target device follow a different path. For example, HID messages are sent through the HID emulator 213 as described above, and data to be loaded onto the device is first loaded onto the storage 218 and then presented to the target device.

The external device port 207 can be used to add additional devices to the edge device 200 which can be exposed to either the onboard computer 205 or a target device. The external device port 207 can be a USB Type-B receptacle coupled with a microcontroller configured as a USB host to allow for the connection of USB devices. For example, a USB flash drive loaded with a disk image to be copied to a target device may be connected to the external device port 207.

The edge device 200 can receive an internet or network connection through the RJ45 port 216, the wireless communication interface 208, and/or the cellular/GPS interface 209. The connection allows for remote IT personnel to access and control the edge device 200. Additionally, the connection can be provided to a target device which is unable to establish a connection through its own network adapters. The RJ45 port 216 receives a connection through a physically connected ethernet cable, the wireless communication interface 208 receives a connection through a wireless radio (e.g., a 2.4 gigahertz or 5 gigahertz radio) in accordance with Institute of Electrical and Electronic Engineers (IEEE) Wi-Fi protocols, and the cellular/GPS interface 209 receives a connection through communication with a cellular network in accordance with cellular communication protocols. The wireless communication interface 208 can also receive a connection via a Bluetooth radio. The interfaces can be enabled and disabled by the onboard computer 205. The onboard computer 205 may enable one interface at a time or prioritize which interface is utilized for a connection. In some implementations, the onboard computer 205 may enable the cellular/GPS interface 209 and operate in a reduced bandwidth mode (e.g., a mode in which the camera 206 is not enabled and no video traffic is being transmitted). Using the internet connection of the cellular/GPS interface 209, remote IT personnel may configure the wireless communication interface 208 to connect to a local Wi-Fi network and then disable the cellular/GPS interface 209 and resume normal operation.

Each of the interfaces connects to or is coupled with an ethernet/network chip (sometimes referred to as a Physical Layer Integrated Circuit (PHY IC)). The ethernet chips may be integrated into the USB hub for onboard computer 204 or integrated within the interfaces, which are then presented as USB devices to the USB hub for onboard computer 204. To provide the connection to a target device, the connection is forwarded to the USB ethernet device 214 which is then selectively presented as a USB device to a target device via the switch 4 224. The USB ethernet device 214 also includes an ethernet chip. Typically, communication between two ethernet chips has a minimum travel distance of 1 meter. This distance ensures that signals between the two network chips can be effectively isolated and coupled to reduce noise and electromagnetic interference (EMI). In some implementations, capacitors and resistors can be used to appropriately condition a signal so that a shorter travel distance between two ethernet chips (e.g., two chips co-located on a circuit board) can be utilized; however, these implementations have been shown to cause inferior communication (e.g., dropped packets) and cause issues with automatic detection of operating frequencies and other handshaking parameters. To resolve these issues, the edge device 200 utilizes the magnetics 215 to condition a connection signal from an enabled interface to the USB ethernet device 214. The magnetics 215 may comprise one or more of transformers, inductors, and filters designed to perform the isolation and coupling of the signals between the enable interface and the USB ethernet device 214 and configured to perform functions such as impedance match, signal shaping, common mode noise reducing and EMI reducing, etc. The magnetics 215 may be implemented within a single integrated circuit or chip module.

The wireless communication interface 208 can also include a radio for short range communications with other devices in accordance with the Bluetooth protocol. For example, the wireless communication interface 208 can pair with a smartphone or similar device via Bluetooth. The smartphone may include an application for transmitting messages to the edge device 200 or, if the edge device 200 does not have an internet connection, supplying an internet connection via a Bluetooth tether with the smartphone. Additionally, in some implementations, the edge device 200 may connect to a target device using the Bluetooth connection instead of through a physical USB connection. The edge device 200 can then wirelessly transmit messages to the target device for providing remote IT support.

The cellular/GPS interface 209 can also be used to determine a terrestrial location of the edge device 200. The cellular/GPS interface 209 may include a chip for communication with a Global Positioning System (GPS). Alternatively or in addition to using the GPS chip, the cellular/GPS interface 209 can determine a terrestrial location using the cellular radio in communication with cellular towers to triangulate a location of the edge device 200. The geographic location of the edge device 200 may be used to provide additional security by limiting use of the edge device 200 to a specified, geo-fenced area. For example, if the edge device 200 is owned and used exclusively by a company, the edge device 200 may be limited to use on premises of the company.

The cryptographic security unit 219 (also referred to as a Trusted Platform Module (TPM)) is used to store one or more keys in embedded non-volatile memory (eNVM). The eNVM may be one-time write or write protected memory which prevents the keys from being modified once written to the eNVM. The keys may be used by the onboard computer 205 to sign and verify messages between the edge device 200 and remote IT support. For example, messages may be encrypted using Rivest-Shamir-Adleman (RSA) or Advanced Encryption Standard (AES) algorithms. The cryptographic security unit 219 may have shared keys which are the same across all manufactured edge devices 200 and unique keys which are different from other edge devices. For example, a unique key may serve as a serial number for the edge device 200 and be globally unique among manufactured edge devices 200. Keys may be specified as required for performing various operations on the edge device 200 and may be used to provide tiered levels of access to the edge device 200. For example, the edge device 200 may require that messages for configuring the wireless communication interface 208 be signed with a key designated for network configuration operations. Additionally, firmware or software updates sent for installation on the edge device 200 can be signed using a key designated for updates, or a digest of an update can be generated by remote IT personnel using a secure hash algorithm (SHA) and signed with the designated key to allow the edge device 200 to determine whether the update has been modified. The cryptographic security unit 219 may include a secure crypto processor or microprocessor for carrying out some of the cryptographic operations described above, such as encrypting/decrypting messages, generating hash digests, etc. The onboard computer 205 would invoke library functions for the cryptographic security unit 219 to carry out the cryptographic operations, such as signing a message. The cryptographic security unit 219 may also have physical security measures to provide tamper resistance.

The camera 206 is positioned to face away from the edge device 200 and can be located in front of a target device to provide video of the device to remote IT personnel. The camera 206 includes hardware for capturing digital video and transmitting the video over the USB hub for onboard computer 204 to the onboard computer 205. For example, the camera 206 may include a chip for encoding the digital video in accordance with an H.264/MPEG format. The onboard computer 205 can then stream the digital video over the internet connection to software of remote IT personnel. The camera 206 may also be equipped with autofocus, image stabilization, or zoom components and a servo motor to enable pan/tilt control. The onboard computer 205 can transmit pan/tilt or zoom commands to the camera 206 so that the camera 206 can be remotely adjusted by remote support. The camera can also be utilized for configuring the edge device 200. For example, the onboard computer 205 may utilize the camera 206 to scan a Quick Response (QR) code which contains configuration information such as a Wi-Fi password.

The battery 231 provides power to the above described components. Power from the battery 231 may be distributed to the components through traces in a PCB. The battery 231 may be charged by connecting the charger port 230 to a power source. The charger port 230 includes a receptacle, e.g., micro-USB, for connecting a power source and can include circuitry, such as regulators, capacitors, and resistors, for conditioning or modifying voltage/amps of received electrical current. The charger port 230 may also include circuitry for bypassing the battery 231 in order to provide power directly to the components when a power source is connected. A power switch (not depicted) may be place in line with a power circuit provided by the charger port 230 and the battery 231 to allow for power to be selectively applied or disconnected from the components of the edge device 200.

The edge device 200 can include a housing for enclosing the above described components. The housing may take a number of form factors such as a cube, rectangular prism, etc. In some embodiments, the edge device 200 may be incorporated into a housing connected with or incorporated in a table, locker, or other surface on which a target device can be placed and connected to the edge device 200 for IT support. The housing can include cutouts for accessing ports such as the USB port for target device 201, external device port 207, RJ45 port 216, and charger port 230. The housing may include other physical features such as a handle for transporting the edge device 200, ventilation holes for cooling the internal components, a mechanism for raising the height of the edge device 200 for positioning the camera 206 in front of a target device, etc.

Various implementations of the edge device 200 can include more or fewer components than those described above and depicted in FIG. 2. For example, some implementations may not include an RJ45 port. Some implementations may use a different configuration or layout of USB hubs. For example, the onboard computer 205 may utilize multiple internal USB hubs which may vary in the number of supported peripherals. In some implementations, the edge device 200 can include an external display for presenting information such as whether a session with IT support has been established, battery level, cellular connection strength, etc. This information can also be presented through one or more light emitting diodes (LEDs) on a housing of the edge device 200. Additionally, in some implementations, a layout of the components can be modified or optimized to fit various form factors for the edge device 200 as described above. For example, the components may be distributed across stacked printed circuit boards to fit a specified housing size for an embodiment of the edge device 200.

Protocols supported and utilized by each of the above components can vary. For example, each of the USB interfaces described above may support one or more of the USB 2.0, 3.0, and 3.1 standards. Additionally, USB ports may be implemented as USB Type-C, Micro-USB, Mini-USB, USB Type-A, or USB Type-B receptacles. The wireless communication interface 208 can support one or more of various Wi-Fi protocols such as 802.11 b, g, n, ac, etc., and the Bluetooth chip within the wireless communication interface 208 can support various Bluetooth protocols such as Bluetooth 4.0, 4.1, Bluetooth Low Energy, etc. The cellular/GPS interface 209 can support one or more of various cellular communication protocols such as third generation (3G), fourth generation (4G, sometimes referred to as Long-Term Evolution (LTE)), and fifth generation (5G).

Figure 3:
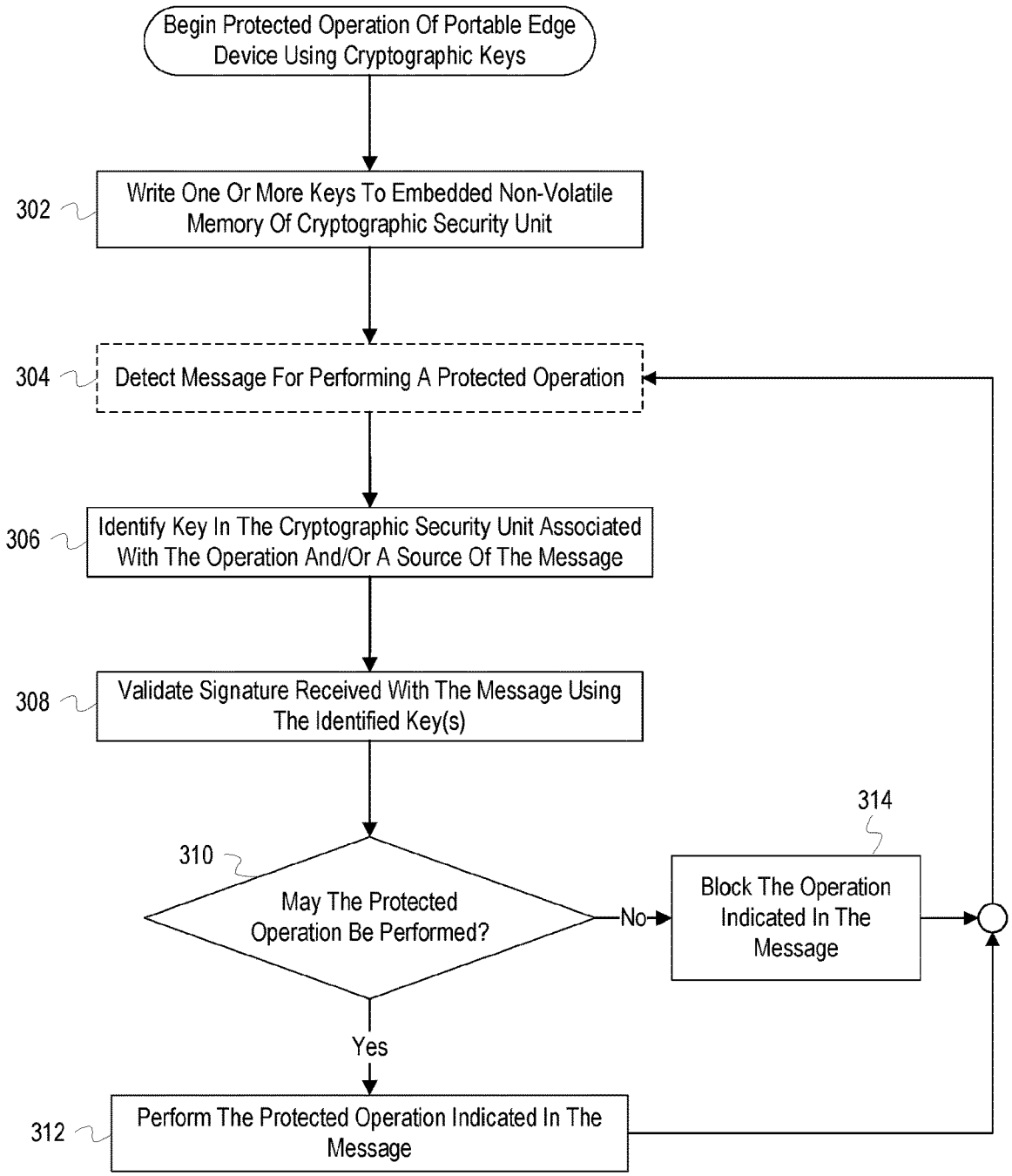
FIG. 3 depicts a flowchart with example operations for protected operation of an edge device using cryptographic keys.

FIG. 3 depicts a flowchart with example operations for protected operation of an edge device using cryptographic keys. FIG. 3 refers to an onboard computer as performing the operations for naming consistency with FIG. 2, although naming of software and hardware can vary among implementations. Additionally, some operations below, such as validating a key or a signature of a message, may be performed by a cryptographic microprocessor in communication with the onboard computer.

An onboard computer ("computer") of an edge device writes one or more keys to embedded non-volatile memory of a cryptographic security unit (302). In general, communications between the computer and a trusted server may be encrypted or signed using keys or certificates which are shared among the devices. Beyond the general use of encrypted communications, additional security can be provided for some operations by requiring a specific key or signature generated using the key to validate that the sender of a message has permission to perform a protected operation indicated in the message. Upon a first startup or initialization of the edge device, the computer may write one or more shared or unique keys to the eNVM and write identifying information for the edge device, such as a model number and a unique serial number. Alternatively, another device may write the keys to the eNVM during a manufacturing process of the edge device. The keys may be generated using a random number generator or pseudo-random number generator. The eNVM may include multiple slots or addressable units for storing keys. The slots can be numbered like an array, e.g., a slot 0, 1, 2, 3, etc. Each slot may be associated with a particular operation or identifying information for the edge device. Slot 0, for example, can store a serial number for a device, slot 1 can store a key used for tasks such as signing a software or firmware update, and slot 2 can store a unique key used to digitally sign messages the edge device 200 sends to a trusted server resource and validate received messages. Multiple slots may be used for general purpose unique keys that can be assigned to particular users or IT support providers. As authorized IT support providers are removed from a particular device, the keys may be unassigned to prevent the support providers from controlling the edge device using the previously assigned key. The computer can include a table that associates slots with their corresponding operation type, assigned user/provider, edge device identifying information, etc. For example, the table may indicate that slot 3 includes a key for network configuration operations. The keys are pre-shared keys with a trusted server or database so that messages sent to the computer can be signed with the appropriate keys. In some implementations, for example, if RSA encryption is being used, the computer may not share a key and, instead, may keep the key private to the edge device and share a paired key which serves as a public key for encrypting messages. The keys may be stored by the trusted server in association with the serial number or other identifying information of the edge device to allow for future retrieval during communications with the edge device. The keys can be selectively assigned or made available by the trusted server to users/IT support providers who are authorized to access and communicate with the edge device. Which keys are made available can vary based on a user's permissions and access level, e.g., whether the user is an administrator or lower level user.

The computer detects a message for performing a protected operation (304). Block 304 is depicted in FIG. 3 using a dashed line as the operations of block 304 may execute in the background and trigger the operations described below each time a message for a protected operation is received. Messages may be received from a trusted server or from a smartphone connected over Bluetooth or other communication interface. Messages may contain a field identifying a message type which indicates an operation or command indicated in the message. For example, message types may include a keyboard/mouse input, a command to activate a switch coupled to a USB device, a command to configure a wireless network interface, etc. Since the messages may be encrypted, the computer may first decrypt a received message and then identify a message type or otherwise determine an operation indicated in the message. If the message type or determined operation corresponds to an operation which has been identified as protected, the computer prevents the operation from being performed until the message has been validated. The computer also identifies a key or signature included in the message.

The computer identifies a key in the cryptographic security unit associated with the protected operation and/or a source of the message (306). The computer may utilize the message or operation type to identify the corresponding slot entry in the eNVM which contains the key associated with the protected operation. Additionally, in some implementations, the key associated with the protected operation may be identified based on a source of the message. For example, one of the keys may have been assigned to a user which has been indicated as an authorized user of the edge device. The computer can determine that the user was the source of the message with the protected operation and retrieve the assigned key. In some instances, the user may need to sign the message with both its assigned key and the key associated with the protected operation in order for the message to be successfully validated. In instances where the cryptographic security unit includes a microprocessor, the computer may not retrieve a key from the eNVM of the security but, instead, generate a command for transmission to the cryptographic security unit which identifies the key to be used, e.g. indicates a corresponding slot/address of the eNVM, for validation of the message.

The computer validates a key/signature received with the message using the identified key(s) (308). Since the messages are encrypted, digital signatures may be appended to the end of messages. The computer can identify the key/signature after decryption and send the key/signature to the cryptographic security unit for validation. If the key/signature successfully validates, the computer determines that the message is valid and was not tampered with in flight to the computer. In addition to keys, other techniques may be used to validate a message. For example, a user's secret credential can be transmitted with each message, and messages may be associated with timestamps which indicate an expiration time for the message. If the credential does not match a stored credential or the timestamp has expired, the message will not be deemed valid.

The computer determines whether the protected operation may be performed (310). If the computer successfully validates the signature/key received with the message, the computer determines that the message is valid and that the protected operation can be performed. If the computer was unable to validate the signature/key received with the message, the computer determines that the message is invalid and that the protected operation cannot be performed.

If the operation can be performed, the computer performs the protected operation indicated in the message (312). For example, the computer may execute an operation for configuring a wireless network interface or presenting a USB device to a target device.

If the signature was not successfully validated, the computer blocks the operation indicated in the message from being performed (314). The computer does not perform the operation and may generate and transmit an alarm back to the trusted server to notify the server of the invalid message. The computer may take additional security actions such as disconnecting network interfaces, disconnecting the USB connection from a target device, etc.

After performing or blocking the protected operation, the computer resumes monitoring for messages for performing protected operations (304).

Figure 4:
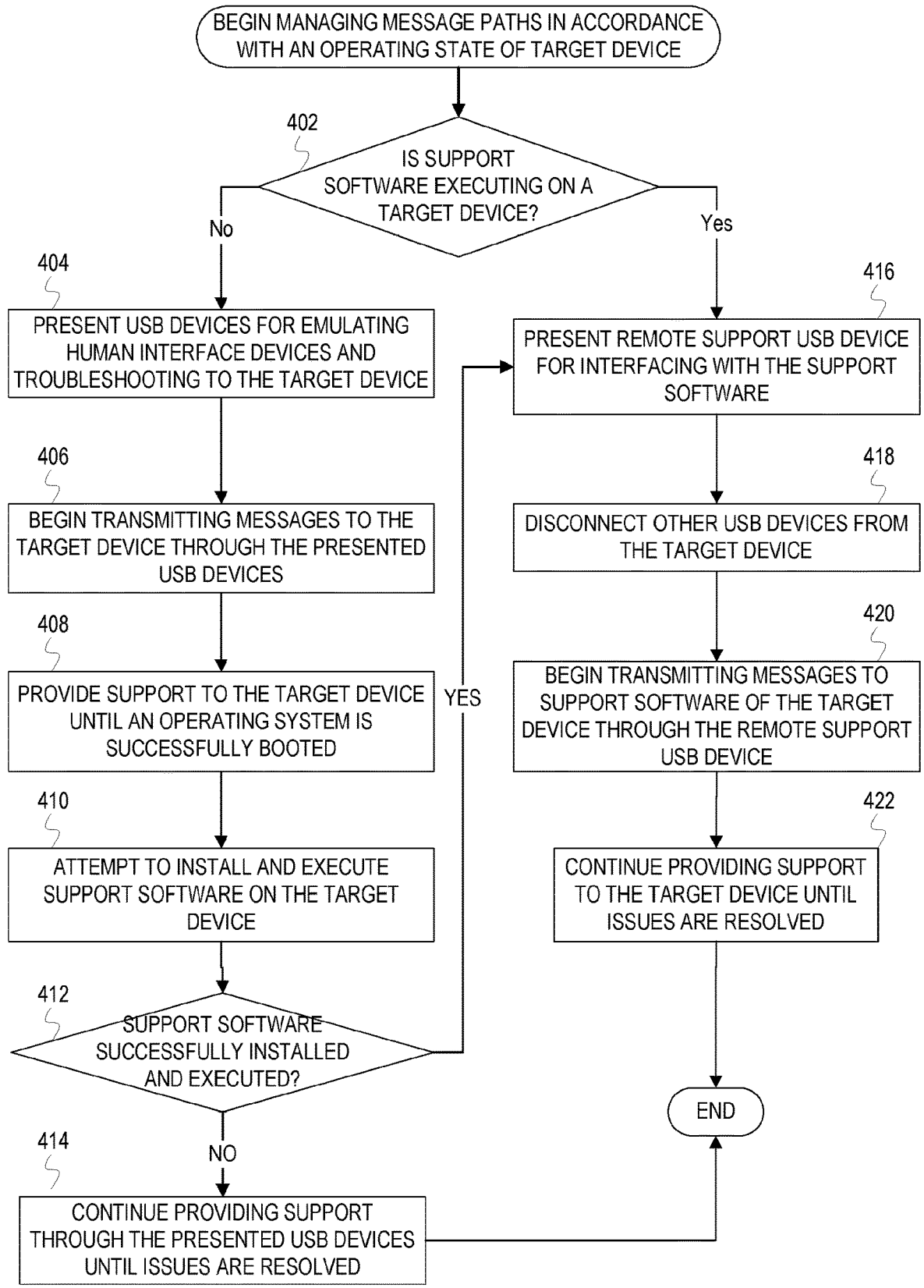
FIG. 4 depicts a flowchart with example operations for managing message paths in accordance with an operating state of a target device.

FIG. 4 depicts a flowchart with example operations for managing message paths in accordance with an operating state of a target device. FIG. 4 refers to an onboard computer as performing the operations for naming consistency with FIG. 2, although naming of software and hardware can vary among implementations.

An onboard computer ("computer") of an edge device determines whether support software is executing on a target device (402). The edge device can operate in different states or modes depending upon the state or functionality of a target device. In a first mode, the edge device presents various USB devices, such as storage and a HID emulator, which communicate as if they were local to the target device. The first mode is useful for situations in which the target device cannot successfully boot an operating system or if BIOS/UEFI settings of the target device need to be modified. However, this mode can suffer from some performance drawbacks such as delay in keyboard and mouse input through the HID emulator, limitations in the ability to load data onto the target device, and poor/delayed video quality of a display of the target device which is provided by the camera of the edge device. Many of these drawbacks can be diminished by operating in a second mode or "direct mode" in which a connection is established between the computer of the edge device and support software executing on the target device. The support software can receive messages directly from the computer which can include keyboard and mouse input, data to be loaded on the device, scripts to be executed, etc. Additionally, the support software can transmit data to the computer such as a high-fidelity stream of the target device's display and diagnostic information for the target device. To determine in which mode to operate, the computer determines whether the support software is executing on the target device. The computer can determine this information based on whether a connection with the support software has been established via a presented remote support USB device, or the computer can receive a message from remote IT personnel indicating that the support software is executing and ready to be utilized.

If the support software is not executing, the computer presents USB devices for emulating HID and troubleshooting to the target device (404). The computer may enable and present various USB devices in response to messages received from remote IT support. Typically, the computer at least presents a HID emulator for transmitting keyboard and mouse input to the target device. The computer may also present USB devices for providing storage/transmitting data to the target device and providing an internet connection. The computer may also enable a camera on the edge device for viewing the target device. The computer presents the USB devices by activating corresponding switches within the edge device. Activating the switches causes the corresponding device to be connected to a USB hub which is connected to the target device.

The computer begins transmitting messages to the target device through the presented USB devices (406). For keyboard and mouse input messages, the computer communicates with the HID emulator through a UART, and the HID emulator relays the received input messages to the target device. For storage USB devices, the computer may switch a USB storage device between itself and the target device so that data may be remotely uploaded to the USB storage device and then provided/moved to the target device.

The computer provides support to the target device until an operating system is successfully booted (408). Through the control of remote support, the computer can transmit messages for controlling the target device in order to install and boot an operating system. For example, the computer may boot the target device into a presented USB storage device which contains an operating system image and proceed with installing the operating system. In some instances, an operating system may not need to be installed but other issues, e.g., viruses or registry errors, may prevent the operating system from booting. Once those issues are resolved, the computer may boot the operating system of the target device.

The computer attempts to install and execute support software on the target device (410). Since the target device is able to boot an operating system, the target device should be capable of executing the support software. The computer may present the support software executable file to the target device through the USB storage device. The computer can then transmit HID messages to continue with installing and executing the support software.

The computer determines whether the support software was successfully installed and executed (412). The computer can determine whether errors occurred during the installation process. The computer can receive a message from remote IT personnel indicating whether the support software is or is not executing and ready to be utilized.

If the support software was not successfully installed, the computer continues providing support through the presented USB devices until issues are resolved (414). The computer can continue transmitting messages and providing support as described above until issues are resolved. After additional troubleshooting and repair, the computer may again attempt to install and execute support software on the target device. Otherwise, once issues are resolved, the support process ends.

If the support software was successfully installed and executed or if the support software was already executing on the target device, the computer presents a remote support USB device for interfacing with the support software executing on the target device (416). The remote support USB device relays messages from the computer to the support software on the target device and vice versa. The remote support USB device may be a custom USB device that transmits messages in a protocol which can be interpreted by the support software. The computer presents the remote support USB device by activating a switch corresponding to the device to connect the device to a USB hub presented to the target device.

The computer disconnects other USB devices from the target device (418). The remote support USB device can be used to send keyboard/mouse input, transmit data, transmit video, provide an internet connection, etc. As a result, the other USB devices presented to the target device can be disconnected. The computer disconnects the devices by activating their switches to sever the connection to the target device USB hub.

The computer begins transmitting messages to the support software executing on the target device through the remote support USB device (420). The computer transmits received IT support messages through the remote support USB device instead of the other previously presented USB devices. For example, if the computer receives keyboard/mouse input messages, the computer may repackage the messages for transmission across the remote support USB device instead of transmitting the messages to a HID emulator. The transmitted messages are received and acted upon by the support software. For example, the support software may transmit the keyboard/mouse input messages to the corresponding processes of the target device operating system. The computer also receives messages from the support software, such as a video feed and diagnostic information, through the remote support USB device which the computer then forwards over the internet to a trusted server.

The computer continues providing support to the target device through the remote support USB device until issues are resolved (422) or the support/management session is terminated. Once issues on the target device are resolved, the process ends.

Remote Support Message Protocol

Figure 5:
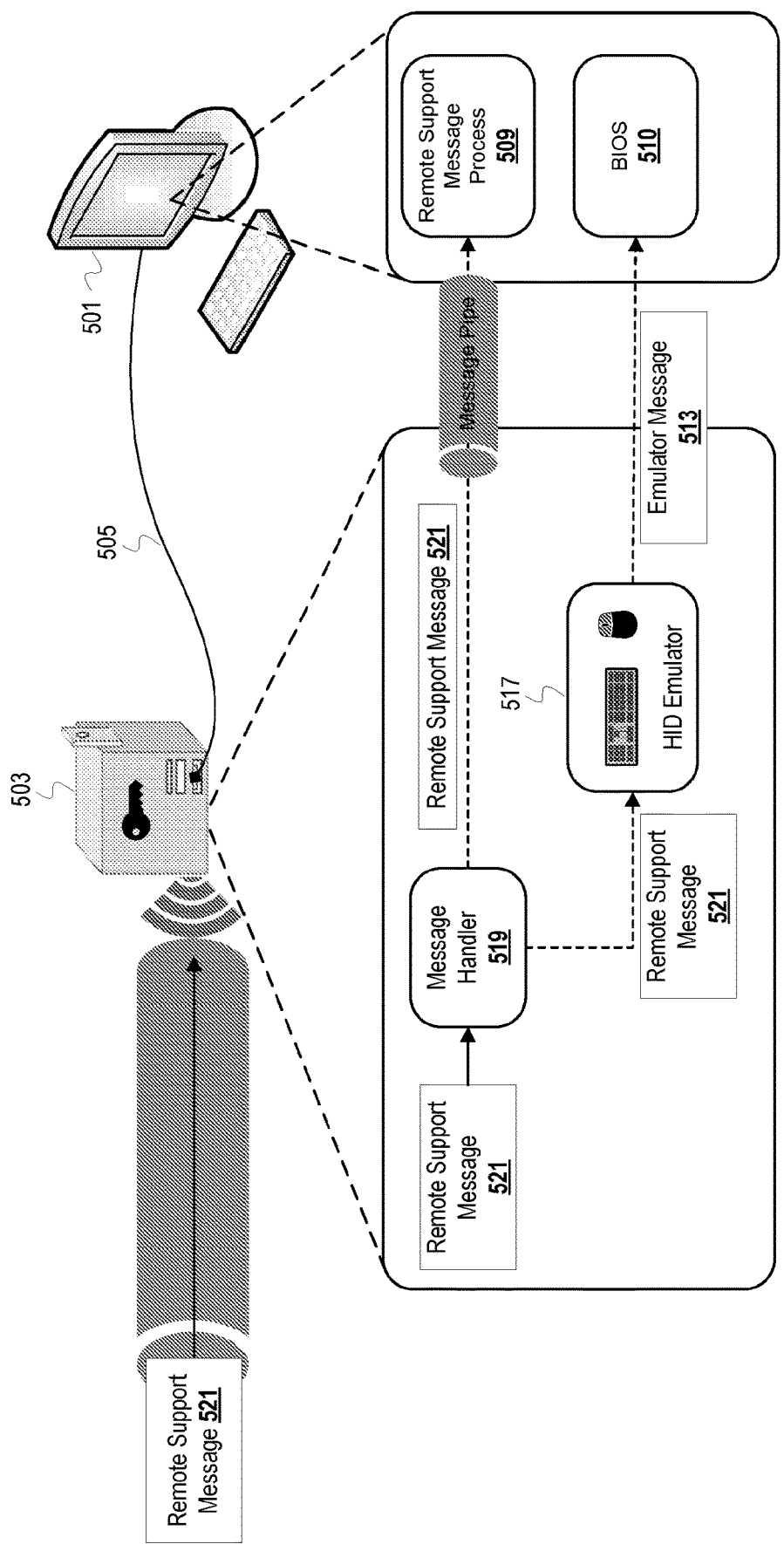
FIG. 5 is a conceptual diagram of communication of messages between an edge device and a target device for remote support of the target device.

FIG. 5 is a conceptual diagram of communication of messages between an edge device and a target device for remote support of the target device. The description of FIG. 5 does not describe the validation of signed messages since that was already described in FIG. 1. FIG. 5 depicts a computer system target device as an example. An edge device 503 is connected to a target device 501 with a cable 505 as described with reference to FIG. 1. Messages are communicated from the edge device 503 to the target device 501 through one of two different message control paths. A peripheral emulation path routes messages through a HID emulator 517 in order to present emulated peripherals to the target device 501. An alternate control path bypasses the HID emulator 517 and instead passes messages through a back-to-back USB microcontroller configuration in the edge device 503 that forms a more direct communication path to a message pipe 511. The message pipe 511 is a logical pipe layered above lower connection medium protocols that carries messages to a remote support message process 509. The remote support message process 509 is a program or process that processes messages from the edge device 503 according to a remote support message protocol.

After the edge device 503 receives a remote support message 521, a message handler 519 executing on the edge device 503 determines if the message should be sent to the target device 501 through the peripheral emulation path or the direct path. The path through which the remote support message 521 is sent is dependent on assessed capability of the target device 501 and/or availability of the remote support message process 509 on the target device 501. In addition, the remote support message 521 may contain a message type indication in a message header that specifies which mode or path to process the remote support message 521.

If the edge device 503 determines that the remote support message process 509 is unavailable and/or the target device 501 has a limited operational state, then the edge device 503 passes the remote support message 521 to the HID emulator 517. The HID emulator 517 processes the remote support message 521 and generates a corresponding emulator message 513 based on the HID being presented to the target device 501. The emulator message 513 is communicated to a BIOS 510 on the target device 501.

If the edge device 503 determined that the remote support message process 509 is available and/or the target device 501 has sufficient operational state to execute the remote support message process 509, then the edge device 503 routes the message 521 through the remote USB device in the edge device 503 and transmits the message 521 via a message pipe to the remote support message process 509.

Messages communicated through the peripheral emulation message path allow the edge device 503 to interact with the target device 501 with any of the emulated peripherals 507 through a single-connection USB interface. The peripheral emulation message path may be used when the target device 501 has not yet satisfied functionality criteria for utilization of the direct path. Messages communicated via the peripheral emulation path can be USB standard compliant messages with fields indicating destination, message type (e.g., keyboard stroke), and data which corresponds to an input or a data request.

After the remote support message process 509 receives the remote support message 521, the remote support message process 509 processes the message 521. The remote support message 521 may include one payload that is a peripheral device input payload or request payload. As an example, the payload may be an operating system command, such as a single input which can be converted to a device management system call. If the remote support message 521 has multiple payloads, then the remote support message process 509 further examines the message content to ascertain the payloads of the remote support message 521 and determine destinations in the target device 501 for the payloads. Based on metadata for the payloads, the remote support message process 509 can pass the payloads to an appropriate process or function of the target device 501, such as drivers and telemetry processes.

For instance, a remote support message may include a message type field and data field for each of the inputs and/or requests which it carries. The remote support message process 509 performs an initial examination of the structure of the remote support message to determine if it has received a remote support message. For example, remote support messages may carry arrays of JavaScript Object Notation (JSON) objects, where each JSON object corresponds to a distinct input or request. The remote support message process 509 identifies that it has received an array containing multiple elements which are to be processed separately. The remote support message process 509 then "unpacks" the remote support message to identify the distinct inputs and requests by traversing the JSON objects and route each to a corresponding destination accordingly.

Figure 6:
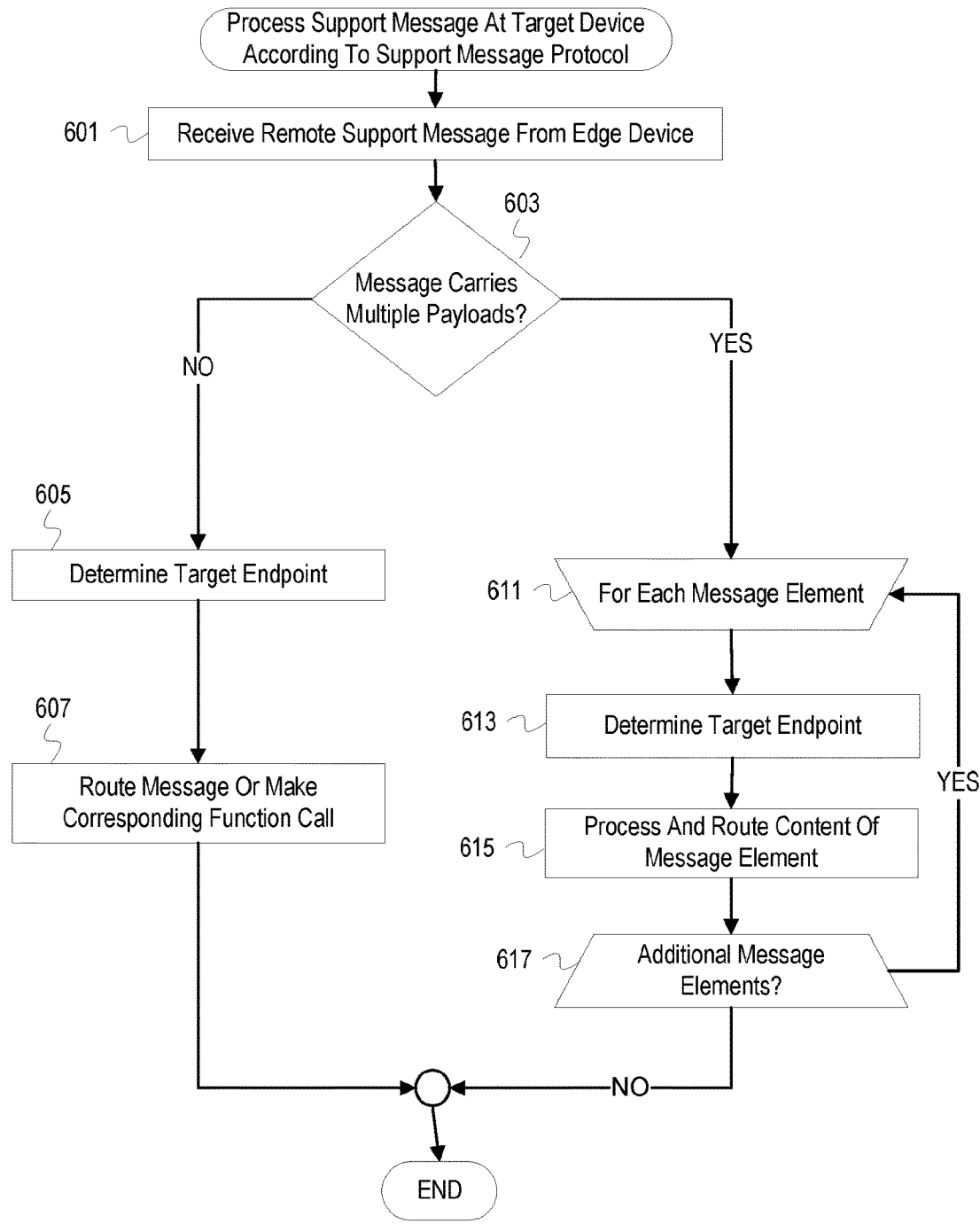
FIG. 6 is a flowchart of example operations for processing a remote support message according to a support message protocol at a target device when the remote support process is available at the target device.

FIG. 6 is a flowchart of example operations for processing a remote support message according to a support message protocol at a target device when the remote support process is available at the target device. The example operations refer to a remote support message process as performing the depicted operations for consistency with FIG. 5, although naming of software and program code can vary among implementations.

The remote support message process receives a message from an edge device (601). The message is communicated from the edge device through a message pipe which has been established between the edge device and the remote support message process on the target device. The message indicates inputs and/or requests to be directed towards components or peripheral drivers of the target device. The message can represent one or multiple peripheral devices, as well as data requests. The message may include an element or payload type and data field for each input or request indicated in the message. Messages which carry multiple different types of message elements/payloads allow for efficient communication of commands, peripheral inputs, and/or data requests from remote technicians (i.e., the remote support software being used by the remote technicians). The type field indicates a peripheral, such as mouse or video card, or a request. The data field includes the provided input or request.

The remote support message process determines whether the message it has received carries multiple payloads or message elements (603). The message may be an input or request which represents one peripheral device which can be converted to an operating system command or a standard message designated for a specific device driver (e.g., input/output device read or write operations). Alternatively, the message may represent inputs for different peripheral devices and/or multiple requests. The remote support message process makes this initial classification based on the message structure. For instance, the remote support message process may determine it has received a remote support message that carries multiple payloads by identifying if the message contains multiple message type fields. The determination can also be made based on identification of multiple message objects present within the message (e.g., within an array of JSON objects).

If the message represents one input or request which can be converted to a corresponding operating system command, the remote support message process determines the target endpoint (605). The corresponding peripheral device is indicated in the message element type field, such as whether the message corresponds to a keyboard, mouse, telemetry process, etc. The target endpoint is determined based on the message element type. For example, the remote support message process may determine that the message element type corresponds to a mouse and the message therefore should be passed to the mouse driver. The remote support message process may also identify if the message is a request based on the determined target endpoint. For instance, the message element type field may identify a telemetry process by name or process identifier.

The remote support message process routes the message to the corresponding target device endpoint or invokes a function defined for the OS or by an application programming interface (API) installed at the target device (607). The remote support message process may direct the message to a driver identified as the target endpoint. The remote support message process may instead invoke or more function calls and pass payload/message element data as parameters via the function call to the target endpoint (e.g., a process or application). For example, the message element type may have been determined to indicate a mouse input with a set of coordinates for the mouse cursor position stored in the message data field. The remote support message process retrieves the coordinates stored in the data field for inclusion as a parameter in the operating system command generated which, when executed, will communicate the coordinates with the mouse driver to ultimately update the position of the cursor on the target device interface.

If the message is determined to carry multiple message elements/payloads, the remote support message process traverses each message element to unpack the remote support message content (609). "Unpacking" the content may be traversing elements/objects of the message carried in the message. The message objects can be multiple inputs and/or requests of different types, each of which may target different endpoints. For instance, the remote support message may be a request for telemetry data as well as a mouse input. The remote support message will include type fields for each of the telemetry request and mouse types and data fields for the requested data and the mouse input. The remote support message process distinguishes the message objects which have been included in the message so that each element may be processed and routed to its target endpoint accordingly.

The remote support message process first determines the target endpoint for the current message element (613). The target endpoint is determined based on the message element type indicated in the message.

The remote support message process processes the current message element and routes the current message element to its target endpoint (615). Message elements are processed such that the endpoint receiving the message can interpret the message accordingly, such as through conversion to or generation of an operating system command or function call. The operating system command may be a driver API call or a system call. The remote support message process may also examine the content of the current message element to determine data which should be communicated to the endpoint (e.g., keystroke data). The remote support message process routes the current message element to the corresponding destination for serving the request or executing the input. For instance, the current message object may be directed to an operating system process or a peripheral device driver.

The remote support message process handles and routes message elements until each of the message elements which was contained in the remote support message has been routed (617). After each message element has been processed and routed, each of the inputs and/or requests indicated in the remote support message which the remote support message process initially received will have been served or executed accordingly.

Figure 7:
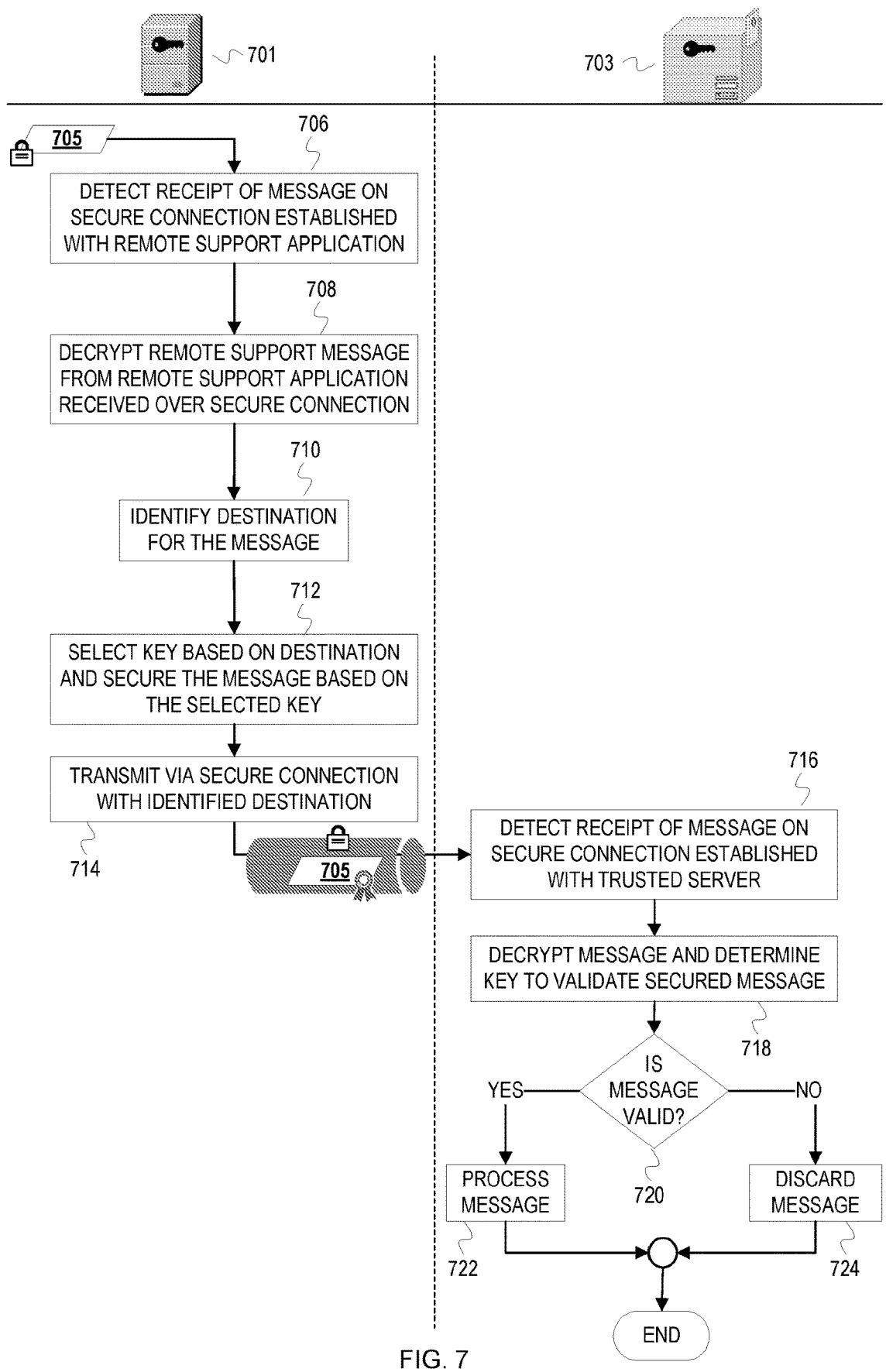
FIG. 7 is a diagram of example operations performed by a trusted server and a remotely controlled support edge device for communicating support messages to the edge device.

FIG. 7 is a diagram of example operations performed by a trusted server and a remotely controlled support edge device for communicating support messages to the edge device. FIG. 7 presumes that a secure connection (e.g., an SSL/TLS encrypted connection) has already been established between a server resource 701 and a remotely controlled support edge device 703. The server resource 701 is "trusted" based on a previously established security agreement between entities corresponding to the server resource 701 and the edge device 703 or based on a single entity owning or at least controlling both the server resource 701 and the edge device 703. The server resource 701 has also already established a secure connection with a support application used by a remote technician.

The server resource 701 detects receipt of a remote support message 705 over the secure connection with the remote support application (706). Since the message 705 was transmitted via a secure connection that terminates at the server resource 701, the server resource 701 decrypts the remote support message 705 (708). After decrypting the message 705, the server resource 701 identifies a destination edge device for the remote support message 705 (710). The server resource 701 can identify the destination edge device from metadata in the remote support message 705, assuming an identifier was previously communicated to the remote support application. In some embodiments, the server resource 701 maintains a data structure that associates or binds secure connections that form a secure path from a remote support application to a remotely controlled support edge device via the server resource 701. The server resource 701 can access the data structure based on a connection identifier or session identifier of the secure connection between the remote support application and the server resource 701 to identify a corresponding secure connection to the edge device 703.

Based on identifying the destination, the server resource 701 selects a cryptography key and secures the message 705 with the selected key (712). The server resource 701 may have access or maintain keys for multiple support edge devices. After identifying the secure connection to the edge device 703 that corresponds to the secure connection with the remote support application, the server resource 701 can access a key repository or security hardware with an identifier of the edge device 703 to select the appropriate key. The server resource 701 may determine the identifier of the edge device 703 by resolving a connection identifier to the edge device identifier or the message may indicate the edge device identifier. Securing the message 705 can be digitally signing the message 705 with the selected key and using a cryptographic hash function. For instance, the server resource 701 may generate a hash of the message with a cryptographic hash function based on the selected key. The server resource 701 then appends the hash to the message 705. The server resource 701 may also concatenate the key with the message signature or hash. Securing the message can also be encoding or encrypting the message 705 with the selected key. The selected key may be an encryption key or public key of the edge device 703. This securing of the message is according to a remote support messaging protocol that is distinct from the securing for the underlying communication protocol, such as securing according to a protocol corresponding to the network layer or transport layer. After securing the message according to the remote support messaging protocol, the trusted server 701 transmits the secured message 705 via the secure connection identified for the destination edge device 703 (714). Transmission along the secure connection may add another level of security that is dependent upon the protocol of the secure connection and independent of the security mechanism being used by the server resource 701 and the edge device 703.

The edge device 703 detects receipt of the secured message 705 over the secured connection with the server resource 701 (716). For instance, a process on the edge device 703 that implements the secured connection monitors a receive buffer for messages.

After receipt of the message 705, the edge device 703 decrypts the secured message 705 and determines a key to validate the message 705 (714). The procedure for validation depends upon how the message was secured. If the message 705 was secured by the server resource 701 digitally signing the message 705, then the edge device 703 validates the signature. For example, the edge device 703 invokes a library defined function implemented by a security module or cryptography chip. In the function invocation, the edge device 703 passes as arguments the message content and the digital signature. Assuming more than one key is present on the edge device 703, an indication of the key would also be passed as an argument in the function call. The edge device 703 can have a default key indication (e.g., memory slot) for incoming messages from a device that is not the target device. Different keys may be associated with different connection mediums and/or different message types.

If the message is determined to be valid (720), then the edge device 703 processes the message 705 (722). Processing the message may be operating in accordance with the message, passing the message to a device emulator on the edge device 703, and/or forwarding the message along a direct message path to the target device via an internal peripheral device that the edge device 703 presents to a target device. Operating in accordance with the message can include configuring components of the edge device 703 (e.g., turning on a radio or connecting to a network). Operating in accordance with the message can also include change of mode of operation for processing incoming messages from the trusted server, such as the emulator mode and a direct mode. The default mode of operation may be the emulator mode, in which the edge device 703 passes incoming message to an internal emulator that presents emulated peripheral devices to a target device. The edge device 703 may switch to the direct mode based on a command message from the trusted server, which can be based on the edge device 703 detecting a functionality criterion for the target device being satisfied (e.g., detecting that a support agent or support message process is running on the target device). In some embodiments, the edge device 703 may not validate messages when operating in a direct mode. The edge device 703 can inform the trusted server that the edge device 703 is operating in the direct mode and cause the server resource 701 to stop securing the messages sent to the edge device 703 beyond that provided by the secure connection. Instead, the edge device 703 secures the messages passed along the direct message path to the target device and the remote support message process on the target device would validate messages. The target device remote support message process would validate messages from the edge device 703 according to a validation technique agreed upon between the edge device 703 and the remote support message process on the target device. This securing of messages to ensure message authenticity from an appropriate source can also employ one-time validation codes generated by the remote support message process to avoid replay attacks.

If the message is not valid, then the edge device 703 discards the message 705 (724). The edge device 703 can generate notification about the invalid message and/or track occurrences of invalid message for later inspection and/or notification.

Figure 8:
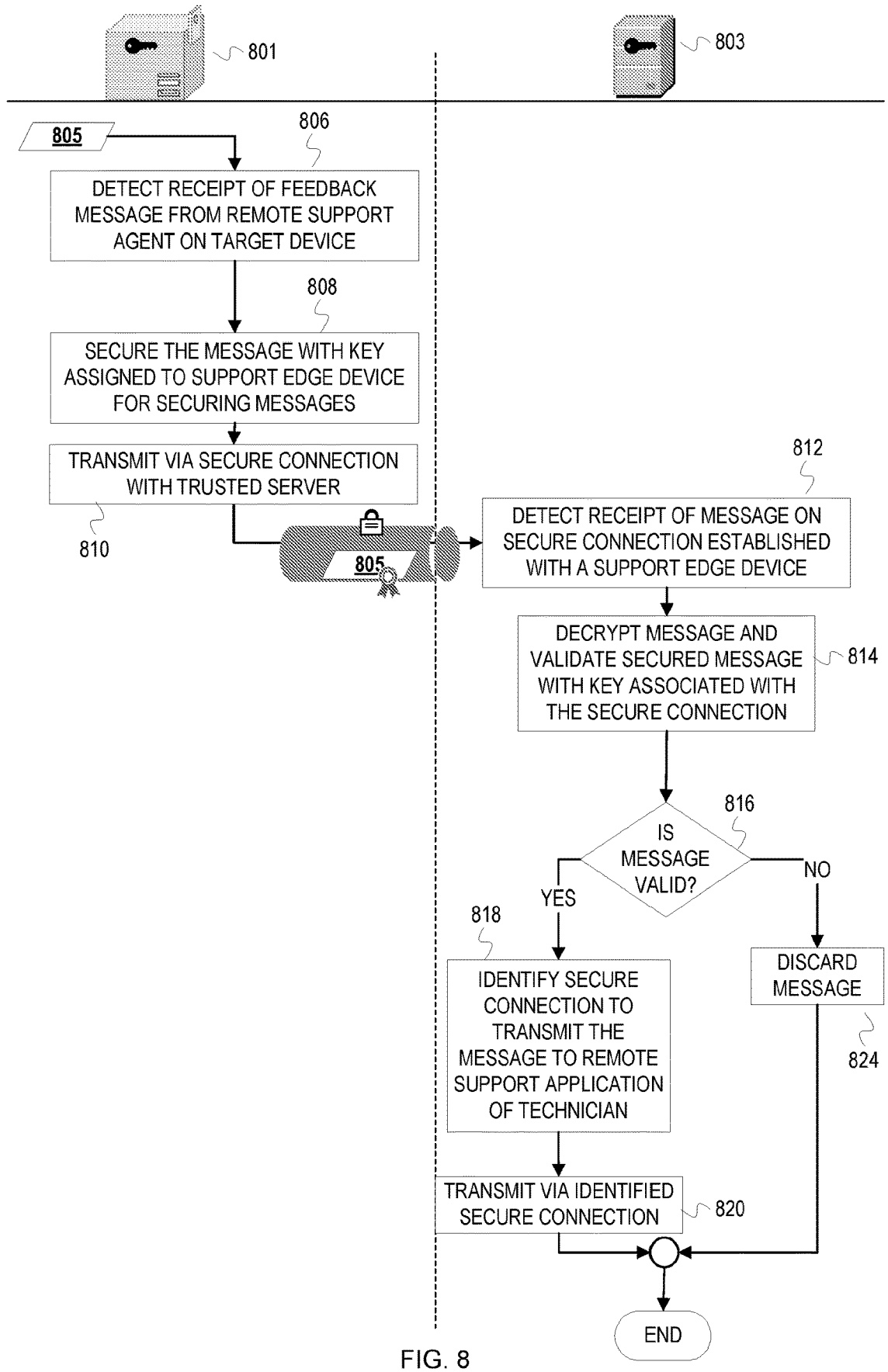
FIG. 8 is a diagram of example operations performed by a trusted server resource and a remotely controlled support edge device for communicating feedback messages to the trusted server.

FIG. 8 is a diagram of example operations performed by a trusted server resource and a remotely controlled support edge device for communicating feedback messages to the trusted server. FIG. 8 presumes that a secure connection has already been established between a trusted server resource 803 and a remotely controlled support edge device 801. The edge device 801 has already detected a remote support message process or remote support agent executing on a target device that is sending feedback messages.

The server resource 803 detects receipt of a feedback message 805 from the remote support agent on the target device (806). Whether traversing the direct message path or the video path, the message is detected by the software running on the onboard computer of the edge device 801. The edge device 801 secures the message 805 with the key of the edge device 801 that corresponds to the secure connection with the server resource 803 (808). As previously mentioned, this securing may be digitally signing or encrypting the message 805. After securing the message, the edge device 801 transmits the message 808 along the secure connection established with the server resource 803 (810).

The server resource 803 detects receipt of the message 805 via the secure connection with the edge device 801 (812). Since the message 805 was encrypted according to the connection protocol of the secure connection, the server 803 decrypts the received message to obtain the message 805 and then validates the message 805 (814). The server 803 validates the message 805 with a key associated with the secure connection. The key may be associated with the secure connection in a table or data structure maintained by the server 803 that relates secure connections forming a secure path from a remote support application of a technician to a support edge device. The server 803 may determine a key for validation by looking up a support edge device identifier in a database of support edge device identifiers and corresponding keys. The support edge device identifier may be indicated in the message 805 or in the structure of secure paths maintained by the server 803.

If the message 805 is determined to be valid (816), then the server 803 identifies a secure connection to transmit the message 805 to the remote support application of the technician (818). The outbound secure connection is determined from previously mentioned data maintained by the server 803 that describes paths traversing the server 803. In some cases, individual processes bound to each pair of secure connections processes support message, in which case a path structure may not be used. After identifying the secure connection for transmission, the server 803 transmits the validated message 805 via the identified secure connection (820).

If the message 805 is invalid (816), then the message 805 is discarded. The server 803 may maintain a log of discarded messages or store invalid messages for later investigation.

The example operations in FIG. 8 presume that the edge device 801 and server 803 continue ensuring authenticity of messages regardless of operational mode of the support edge device 801. As mentioned in FIG. 7, the support edge device 801 and the server 803 may discontinue securing support messages (distinct from any securing for the communication protocol) between each other when the support edge device 801 operates in the direct mode or direct message path mode. For such embodiments, the support edge device 801 and the target device can perform operations to ensure authenticity of support messages and avoid attacks on the connection between the support edge device 801 and the target device. The edge device 801 would not secure the message (808), but instead validate the message from the target device.

Figure 9:
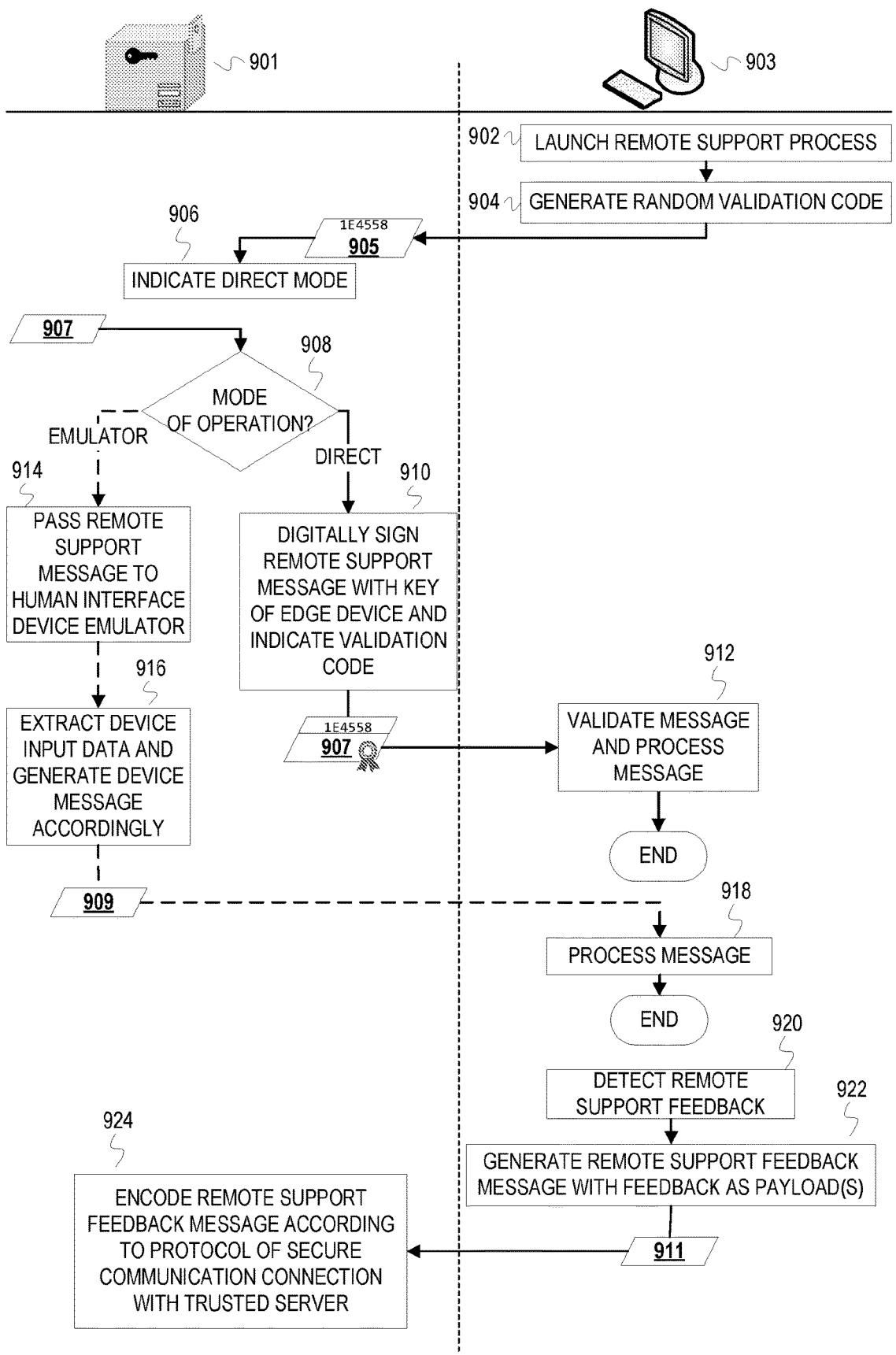
FIG. 9 is a diagram of example operations performed by a remotely controlled support edge device and a target device.

FIG. 9 is a diagram of example operations performed by a remotely controlled support edge device and a target device. The example operations of FIG. 9 relate to the transition of responsibility for ensuring authenticity of support messages from the trusted server-RC support edge device pair to the RC support edge device-target device pair based on a switch to direct mode or the direct message path. FIG. 9 depicts dashed lines for the flow of operations that diverge from the direct mode (i.e., emulator mode).

Either based on direct commands from a remote technician via a RC support edge device 901 or a local execution command on a target device 903, a remote support process or remote support message process launches on the target device 903 (902). The program code for the remote support process may be installed from the edge device 901 or have been previously installed on the target device 903. After launching, the remote support process generates a random validation code, such as a one-time password or pin code (904)—illustrated in FIG. 1 as 1E4558. The target device 903 communicates the validation code in a message 95 to the edge device 901. Based on receipt of the validation code from the target device 903, the edge device 901 indicates a direct mode as an operational mode for the edge device 901 (906). This can be setting a flag or value to indicate to support software executing on an onboard computer of the edge device 901 that remote support messages from the trusted server should be forwarded along the direct message path via the internal peripheral device that the edge device 901 presents to the target device 903. The edge device 901 can also implicitly indicate direct mode by, for example, storing the validation code in memory location reserved for the validation code corresponding to direct mode.

At a different time, the edge device 901 receives a remote support message 907 and determines whether to process the message 907 in the direct mode or emulator mode (908). The edge device 901 may read a reserved memory location or pre-define memory location to determine whether a flag or value indicates direct mode. If the edge device 901 determines that it is operating in direct mode, then the edge device 901 digitally signs the remote support message and indicates the validation code (910). The edge device 901 digitally signs the remote support message with key of the edge device 901 that the target device "knows" corresponds to the edge device 901. The target device 903 may "know" the key corresponds to the edge device 901 because the key was previously communicated to the target device 903 along with an identifier of the edge device, the remote support process has been configured with the key, etc. The edge device 901 transmits the digitally signed message 907 with the indication of the validation code to the target device 903. Based on receipt of the message 907, the target device 903 attempts to validate the received message (912). To validate, the target device 903 validates the digital signature and the validation code. If validated, the target device 903 processes the message (e.g., passes to a device driver, invokes a function call, etc.). If not validated, the target device 903 discards the message.

If the edge device 901 determined that the message 907 was received while operating in the emulator mode (908), then a different message path is taken. The edge device 901 passes the message 907 to a HID emulator on the edge device 901 (914). The HID emulator on the edge device 901 extracts from the message 907 input data or command data for one or more human interface devices presented by the emulator to the target device 903 (916). The HID emulator generates a device message(s) 909 according to the extracted data (916) and transmits the message 909 to the target device 903. The target device 903 then processes the message 909 by passing the message 909 to the operating system call or a device driver indicated in the message 909 (918).

When remote support feedback is generated, the remote support process on the target device 903 detects the remote support feedback (920). The remote support process may receive data (e.g., system information) pursuant to an operating system call, inter-process communication, responsive to invoking an API function for obtaining performance data about the target device 903, etc. The remote support process also detects screen/display updates after conveying commands and/or inputs received in messages from the edge device 901. The remote support process may detect the screen/display updates by detecting pixel updates or display commands from an application on the target device 903 or the operating system of the target device 903. The remote support process receives these pixel updates or display commands either directly because it has indicated itself as a destination for pixel updates or display commands to applications and the operating system, or receives them indirectly. The remote support process on the target device may receive these display updates from a graphics process that is part of a remote support application corresponding to the remote support process or is launched by the remote support process. The remote support process generates a remote support feedback message 911 with the detected feedback as a payload(s) (922). The remote support process may detect multiple feedback and wrap the multiple feedback into a message as multiple payloads. For example, the remote support process may generate a JSON object for a display update and a JSON object for telemetry data. The message is formatted according to the remote support protocol that defines the formatting of messages being exchanged between the remote support software used by the remote technicians, the edge device 901, and the target device 903. The remote support process communicates the message 911 over the connection or link between the target device 903 and the edge device 901. The edge device 901 encodes the remote support feedback message according to the protocol of the secure communication connection established between the edge device 901 and a trusted server (924). For instance, the edge device 901 encrypts the message 911 with an SSL or TLS session key.

Variations

The above example illustrations depict and describe a wired connection between the remotely controlled (RC) support edge device and a target device. Embodiments can employ other connection types based on the level of security desired for the target device. For instance, the NFC components of the RC support edge device can be used to communicate with a target device. Other types of connection mediums associated with a protocol that allows for plug-n-play or hot swapping functionality could also be used.

The above example illustrations also depict the RC support edge device as a cube device, but embodiments are not so limited. Embodiments of the RC support edge device can take form as a sphere. The sphere RC support edge device can be created with additional components, such as a gyroscope and additional control software to allow a RC support edge device to control movement of the sphere RC support edge device.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 10:
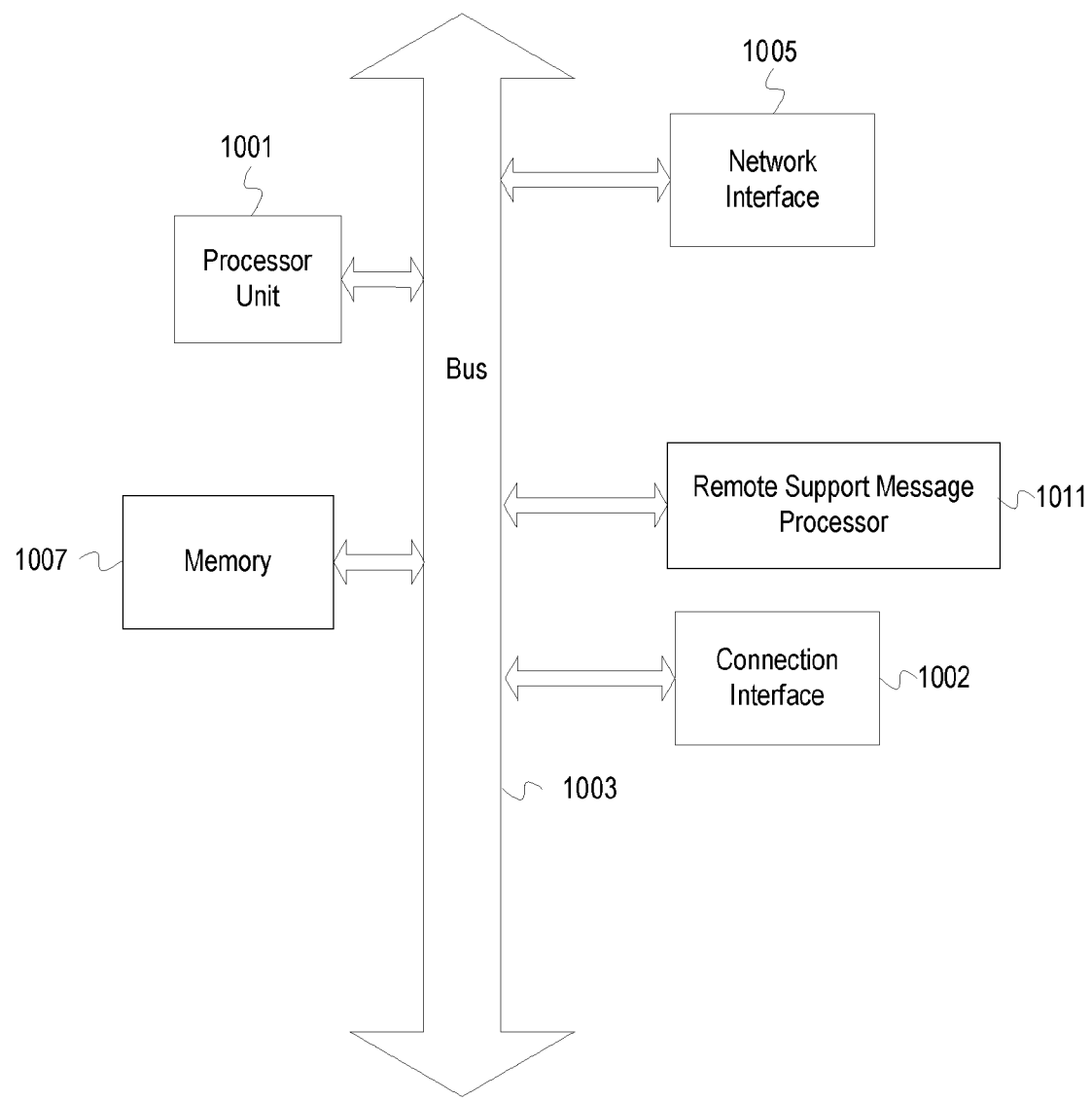
FIG. 10 depicts an example computer system with a remote support message processor.

FIG. 10 depicts an example computer system with a remote support message processor. The computer system includes a processor 1001 (possibly including multiple processors, multiple cores, multiple nodes, and/or implementing multi-threading, etc.). The computer system includes memory 1007. The memory 1007 may be system memory (e.g., volatile or non-volatile memory) or any one or more of the above already described possible realizations of machine-readable media. The computer system also includes a bus 1003, a connection interface 1002, and a network interface 1005. The system also includes a remote support message processor 1011. The remote support message processor 1011 communicates with counterpart software executing on a RC support edge device that sends messages that may carry inputs for a represented peripheral device over a single connection between the RCE support edge device and the computer system. The single connection may be with the connection interface 1002 or the network interface 1005. The remote support message processor 1011 examines a received message to determine whether the message carries a single element or multiple elements of different types. The remote support message processor 1011 may pass the message to a driver, invoke a function call, call an operating system command of the computer system. The received message conforms to a remote support message protocol that specifies layout of message elements when multiple elements are carried in a message. The remote support message protocol specifies whether the message is an array of objects that each self-identify a target endpoint. The remote support message protocol may specify field sizes for type fields to indicate a target endpoint for a subsequent field that carries the data to be consumed by the target endpoint or data to be passed as parameters in a function invocation. Any one of the previously described functionalities of the remote support message processor 1011 may be partially (or entirely) implemented in hardware and/or on the processor 1001. For example, the functionality may be implemented with an application specific integrated circuit, in logic implemented in the processor 1001, in a co-processor or on a peripheral device or card, etc. Further, realizations may include fewer or additional components not illustrated in FIG. 10 (e.g., video cards, audio cards, additional network interfaces, peripheral devices, etc.). The processor 1001 and the network interface 1005 are coupled to the bus 1003. Although illustrated as being coupled to the bus 1003, the memory 1007 may be coupled to the processor 1001.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

A method comprises establishing, by an edge device, a first network connection with a first network after the edge device validates a first signed request to connect to the first network, wherein the signed request was communicated to the edge device. After establishing the first network connection, the edge device establishes a first secure communication connection between the edge device and a server. The edge device captures video of a target device and transmits the video via the first secure communication connection. Based on the edge device detecting the target device via a connection medium that connects the edge device to the target device, the edge device presents an emulated human interface device to the target device via the connection medium. Based on receipt of a first message over the first secure communication connection, the edge device transmits via the connection medium a first input indicated in the first message as first input for the emulated human interface device.

The method further comprises the edge device wirelessly communicating a unique identifier of the edge device in response to detection of an activation input to the edge device.

The method further comprises the edge device presenting via a display on the edge device a unique identifier of the edge device in response to detection of an activation input to the edge device.

The method further comprises validating the first signed request with a first security key that is locally stored on the edge device. The first security key was bound to the edge device at a root of trust.

In the method, the first signed request was signed by the server.

The method further comprising identifying the server with which to establish the first secure communication connection from the first signed request.

In the method, the connection medium is a wireless or a wired connection medium.

The method further comprising the edge device detecting a feedback message from the target device and forwarding the feedback message to the server via the first secure communication connection. The feedback message comprises screen capture data or display update data.

The method further comprising the server communicating the feedback message and the video to an authorized endpoint via a second secure communication connection established between the authorized endpoint and the server and the server communicating the first message to the edge device based on receipt of the first message from the authorized endpoint.

The method further comprising the edge device validating the first message based on a digital signature associated with the first message with a security key bound to the edge device, wherein validating the first message is distinct from message authentication corresponding to a security protocol of the first secure communication connection.

A system comprising an edge device having a plurality of machine-readable media, a video camera, a radio, a wired connection interface, an onboard computer, a human interface device emulator, and a configurable peripheral device. A first of the machine-readable media comprises program code executable by a processor of the onboard computer to cause the edge device to indicate a unique identifier of the edge device based on activation of the edge device; validate a signed configuration request with a first key stored on the edge device; connect via the radio to a network after validation of the signed configuration request which indicates the network; establish a first secure communication connection with a server previously identified to the edge device; determine which of a plurality of operational modes is indicated in the edge device; communicate messages received over the first secure communication connection over a first message path based on a determination that the edge device is operating in a first mode, wherein the first message path includes the configurable peripheral device; communicate messages received over the first secure communication connection over a second message path based on a determination that the edge device is operating in a second mode, wherein the second path includes the human interface device emulator; and communicate feedback messages from the target device to the server via the first secure communication connection.

The system further comprising the server, the server having a machine-readable medium comprising program code executable by the server to cause the server to establish the first secure communication connection with the edge device and a corresponding second secure communication connection with a support application that is remote from the edge device and the server; sign messages from the support application with a second key accessible to the server, wherein the messages are signed prior to transmission of the messages to the edge device from the server and wherein the first key corresponds to the second key, wherein the server signing the messages with the second key is distinct from message authentication based on a communication protocol corresponding to the second secure communication connection.

In the system, the first and second keys are a pre-shared key distinct from any key used for the first and the second secure communication channels.

In the system, the second machine-readable medium of the server further comprises program code executable by the server to cause the server to determine authorization of an authenticated user to configure the edge device based on receipt of a request that indicates credentials of the authenticated user and identifies the edge device.

In the system, the second machine-readable medium of the server further comprises program code executable by the server to cause the server to authenticate the credentials indicated in the request to configure the edge device based on receipt of the request.

In the system, the edge device further comprises an activation component, wherein the program code to indicate a unique identifier of the edge device is executable by the onboard computer to cause the edge device to indicate the unique identifier in response to activation of the activation component.

In the system, the wired interface is a universal serial bus compliant interface.

In the system, the edge device further comprises a cryptographic module that stores the first key and validates the signed configuration request.

A non-transitory machine-readable medium having program code stored thereon, the program code executable by a processor to cause a computing device to establish a first network connection with a first network after the computing device validates a first signed request to connect to the first network, wherein the signed request was communicated to the computing device; establish a first secure communication connection between the computing device and a server after establishing the first network connection; capture video of a target device and transmit the video via the first secure communication connection; present an emulated human interface device to the target device via the connection medium based on the detection of connection to the target device via a connection medium; and transmit via the connection medium a first input indicated in the first message as first input for the emulated human interface device based on receipt of a first message over the first secure communication connection.

What is claimed is:

1. A system comprising:
  an edge device having a plurality of machine-readable media, a video camera, a radio, a wired connection interface, an onboard computer, a human interface device emulator, and a configurable peripheral device,
  wherein a first of the machine-readable media comprises program code executable by a processor of the onboard computer to cause the edge device to, indicate a unique identifier of the edge device based on activation of the edge device;

validate a signed configuration request with a first key stored on the edge device;

connect via the radio to a network after validation of the signed configuration request which indicates the network;

establish a first secure communication connection with a server previously identified to the edge device;

determine which of a plurality of operational modes is indicated in the edge device;

communicate messages received over the first secure communication connection over a first message path based on a determination that the edge device is operating in a first mode, wherein the first message path includes the configurable peripheral device;

communicate messages received over the first secure communication connection over a second message path based on a determination that the edge device is operating in a second mode, wherein the second message path includes the human interface device emulator; and communicate feedback messages from a target device to the server via the first secure communication connection.

2. The system of claim 1 further comprising the server, the server having a second machine-readable medium comprising program code executable by the server to cause the server to, establish the first secure communication connection with the edge device and a corresponding second secure communication connection with a support application that is remote from the edge device and the server; and sign messages from the support application with a second key accessible to the server, wherein the messages are signed prior to transmission of the messages to the edge device from the server and wherein the first key corresponds to the second key, wherein the server signing the messages with the second key is distinct from message authentication based on a communication protocol corresponding to the second secure communication connection.

3. The system of claim 2, wherein the first and second keys are a pre-shared key distinct from any key used for the first and the second secure communication connections.

4. The system of claim 2, wherein the second machine-readable medium of the server further comprises program code executable by the server to cause the server to authenticate credentials indicated in a request to configure the edge device based on receipt of the request.

5. The system of claim 1, wherein the edge device further comprises an activation component, wherein the program code to indicate a unique identifier of the edge device is executable by the onboard computer to cause the edge device to indicate the unique identifier in response to activation of the activation component.

6. The system of claim 1, wherein the wired connection interface is a universal serial bus compliant interface.

7. The system of claim 1, wherein the edge device further comprises a cryptographic module that stores the first key and validates the signed configuration request.

* * * * *